US 12,285,855 B2

(12) United States Patent
Zhu et al.

(10) Patent No.: US 12,285,855 B2
(45) Date of Patent: Apr. 29, 2025

(54) SYSTEM AND METHOD FOR RF BASED ROBOT LOCALIZATION

(71) Applicant: Samsung Electronics Co., Ltd., Suwon-si (KR)

(72) Inventors: Yuming Zhu, Plano, TX (US); Indranil Sinharoy, Richardson, TX (US); Songwei Li, McKinney, TX (US); Boon Loong Ng, Plano, TX (US); Jianzhong Zhang, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 58 days.

(21) Appl. No.: 17/938,300

(22) Filed: Oct. 5, 2022

(65) Prior Publication Data

US 2023/0113061 A1    Apr. 13, 2023

Related U.S. Application Data

(60) Provisional application No. 63/254,802, filed on Oct. 12, 2021.

(51) Int. Cl.
  *B25J 13/00* (2006.01)
  *A01D 34/00* (2006.01)
  *G01S 5/02* (2010.01)

(52) U.S. Cl.
  CPC .................. *B25J 13/006* (2013.01)

(58) Field of Classification Search
  CPC .. B25J 13/006; G01S 13/0209; G01S 13/765; G01S 13/878; H04W 84/18; H04W 64/006

(Continued)

(56) References Cited

U.S. PATENT DOCUMENTS

| 1,037,038 A | 8/1912 | Mott |
| 6,377,888 B1 | 4/2002 | Olch |

(Continued)

FOREIGN PATENT DOCUMENTS

| CN | 109000660 A | 12/2018 |
| CN | 110022574 A | 7/2019 |

(Continued)

OTHER PUBLICATIONS

International Search Report and Written Opinion issued Dec. 28, 2023 regarding International Application No. PCT/KR2022/015293, 7 pages.

(Continued)

*Primary Examiner* — Jaime Figueroa

(57) ABSTRACT

A method includes, when a handheld device is in motion within a service area to be traversed by a robot: obtaining ultra-wideband (UWB) ranging measurements between the handheld device and multiple anchors located in the service area; and obtaining image data and inertial measurement unit (IMU) data. The method also includes determining a trajectory of motion of the handheld device based on the UWB ranging measurements. The method also includes adjusting the trajectory based on image features obtained from the image data and motion estimates obtained from the IMU data. The method also includes identifying the adjusted trajectory as a boundary of the service area.

20 Claims, 28 Drawing Sheets

(58) Field of Classification Search
USPC .............. 700/245–264; 318/568.11–568.25
See application file for complete search history.

(56) References Cited

U.S. PATENT DOCUMENTS

| | | | |
|---|---|---|---|
| 8,938,318 | B2 | 1/2015 | Bergstrom et al. |
| 9,510,505 | B2 | 12/2016 | Halloran et al. |
| 9,826,678 | B2 | 11/2017 | Balutis et al. |
| 9,854,737 | B2 | 1/2018 | Yamauchi et al. |
| 10,029,368 | B2 | 7/2018 | Wolowelsky et al. |
| 10,353,399 | B2 | 7/2019 | Ebrahimi Afrouzi |
| 11,178,811 | B2 | 11/2021 | Ko et al. |
| 11,266,067 | B2 | 3/2022 | Ko et al. |
| 11,889,491 | B2 * | 1/2024 | Zhbankov ............. G01S 5/0215 |
| 2009/0262710 | A1 | 10/2009 | Doi et al. |
| 2012/0290165 | A1 | 11/2012 | Ouyang |
| 2013/0030609 | A1 | 1/2013 | Jagenstedt |
| 2013/0110322 | A1 | 5/2013 | Jagenstedt et al. |
| 2014/0102061 | A1 | 4/2014 | Sandin et al. |
| 2014/0159888 | A1 | 6/2014 | Gauger et al. |
| 2016/0100522 | A1 | 4/2016 | Yamauchi et al. |
| 2016/0349362 | A1 | 12/2016 | Rorh et al. |
| 2017/0042087 | A1 | 2/2017 | Ohrlund et al. |
| 2017/0357006 | A1 | 12/2017 | Ohrlund et al. |
| 2018/0067191 | A1 | 3/2018 | Hamilton |
| 2018/0257502 | A1 | 9/2018 | Park |
| 2018/0267552 | A1 | 9/2018 | Artes et al. |
| 2019/0163174 | A1 | 5/2019 | Ko et al. |
| 2019/0294172 | A1 | 9/2019 | Liu et al. |
| 2019/0378360 | A1 | 12/2019 | Bergenholm et al. |
| 2020/0041601 | A1 | 2/2020 | Ko et al. |
| 2021/0064043 | A1 | 3/2021 | Kulkarni et al. |
| 2021/0165109 | A1 | 6/2021 | Yang et al. |
| 2021/0168996 | A1 | 6/2021 | Lee et al. |
| 2022/0299592 | A1 * | 9/2022 | Chiu .................... G01S 13/865 |
| 2022/0377752 | A1 * | 11/2022 | Zhbankov ............. G01S 5/0263 |

FOREIGN PATENT DOCUMENTS

| | | |
|---|---|---|
| JP | 2007-141108 A | 6/2007 |
| JP | 2021-093032 A | 6/2021 |
| KR | 10-2003-0049319 A | 6/2003 |
| KR | 10-2021-0059839 A | 5/2021 |
| KR | 10-2021-0071383 A | 6/2021 |
| WO | 2017/167207 A1 | 10/2017 |
| WO | 2019/068175 A1 | 4/2019 |

OTHER PUBLICATIONS

International Search Report and Written Opinion of the International Searching Authority dated Nov. 20, 2020 in connection with International Application No. PCT/KR2020/011577, 8 pages.
Extended European Search Report issued Jul. 28, 2022 regarding Application No. 20858207.2, 10 pages.
USPTO Office Action issued Aug. 11, 2022 regarding U.S. Appl. No. 17/003,834, 33 pages.
USPTO Final Office Action issued Feb. 23, 2023 regarding U.S. Appl. No. 17/003,834, 61 pages.
USPTO Office Action issued Jun. 8, 2023 regarding U.S. Appl. No. 17/003,834, 34 pages.
USPTO Final Office Action issued Aug. 29, 2023 regarding U.S. Appl. No. 17/003,834, 32 pages.
Partial Supplementary European Search Report issued Nov. 7, 2024 regarding Application No. 22881309.3, 14 pages.
Extended European Search Report issued Feb. 21, 2025 regarding Application No. 22881309.3, 19 pages.

* cited by examiner

User at starting position A

User at intermediate position B

UI at the completion of perimeter teaching

UI showing a set of floating and fixed control points on the perimeter

Map following modification

UI for modifying the lines joining the anchors.

Polygonal shaped map obtained by modifying the lines joining the anchors.

SYSTEM AND METHOD FOR RF BASED ROBOT LOCALIZATION

CROSS-REFERENCE TO RELATED APPLICATIONS AND CLAIM OF PRIORITY

The present application claims priority to U.S. Provisional Patent Application Ser. No. 63/254,802 filed on Oct. 12, 2021. The content of the above-identified patent document is incorporated herein by reference.

TECHNICAL FIELD

The present disclosure relates generally to wireless communication systems and, more specifically, the present disclosure relates to a system and method to for a radio frequency (RF) based robot localization.

BACKGROUND

Autonomous service robots, such as vacuum cleaners and lawn mowers, have gained popularity in home and business environments in recent years. Early generations of such robots used simple controls, such as moving until the robot bumps into a wall or another obstacle, and then turning. For some robots such as lawn mowers, the bump-and-turn can be a dangerous strategy, as it might cause damage to property and/or the robot itself. Thus, additional sensors (e.g., camera, grass sensor, etc.) or infrastructure (a buried boundary wire with DC voltage) may be used to minimize or avoid dangerous situations.

SUMMARY

The present disclosure relates to wireless communication systems and, more specifically, the present disclosure relates to a system and method for a RF based robot localization.

In one embodiment, a method includes, when a handheld device is in motion within a service area to be traversed by a robot: obtaining ultra-wideband (UWB) ranging measurements between the handheld device and multiple anchors located in the service area; and obtaining image data and inertial measurement unit (IMU) data. The method also includes determining a trajectory of motion of the handheld device based on the UWB ranging measurements. The method also includes adjusting the trajectory based on image features obtained from the image data and motion estimates obtained from the IMU data. The method also includes identifying the adjusted trajectory as a boundary of the service area.

In another embodiment, a device includes an image sensor, an IMU, and a processor operably connected to the image sensor and the IMU. The processor is configured to: when the device is in motion within a service area to be traversed by a robot: obtain UWB ranging measurements between the device and multiple anchors located in the service area; obtain image data from the image sensor; and obtain IMU data from the IMU. The processor is also configured to determine a trajectory of motion of the device based on the UWB ranging measurements. The processor is also configured to adjust the trajectory based on image features obtained from the image data and motion estimates obtained from the IMU data. The processor is also configured to identify the adjusted trajectory as a boundary of the service area.

In yet another embodiment, a non-transitory computer readable medium includes program code that, when executed by a processor of a device, causes the device to: when the device is in motion within a service area to be traversed by a robot: obtain UWB ranging measurements between the device and multiple anchors located in the service area, and obtain image data and IMU data; determine a trajectory of motion of the device based on the UWB ranging measurements; adjust the trajectory based on image features obtained from the image data and motion estimates obtained from the IMU data; and identify the adjusted trajectory as a boundary of the service area.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 29B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

The present disclosure covers several components which can be used in conjunction or in combination with one another or can operate as standalone schemes. Certain embodiments of the disclosure may be derived by utilizing a combination of several of the embodiments listed below. Also, it should be noted that further embodiments may be derived by utilizing a particular subset of operational steps as disclosed in each of these embodiments. This disclosure should be understood to cover all such embodiments.

Figure 1:
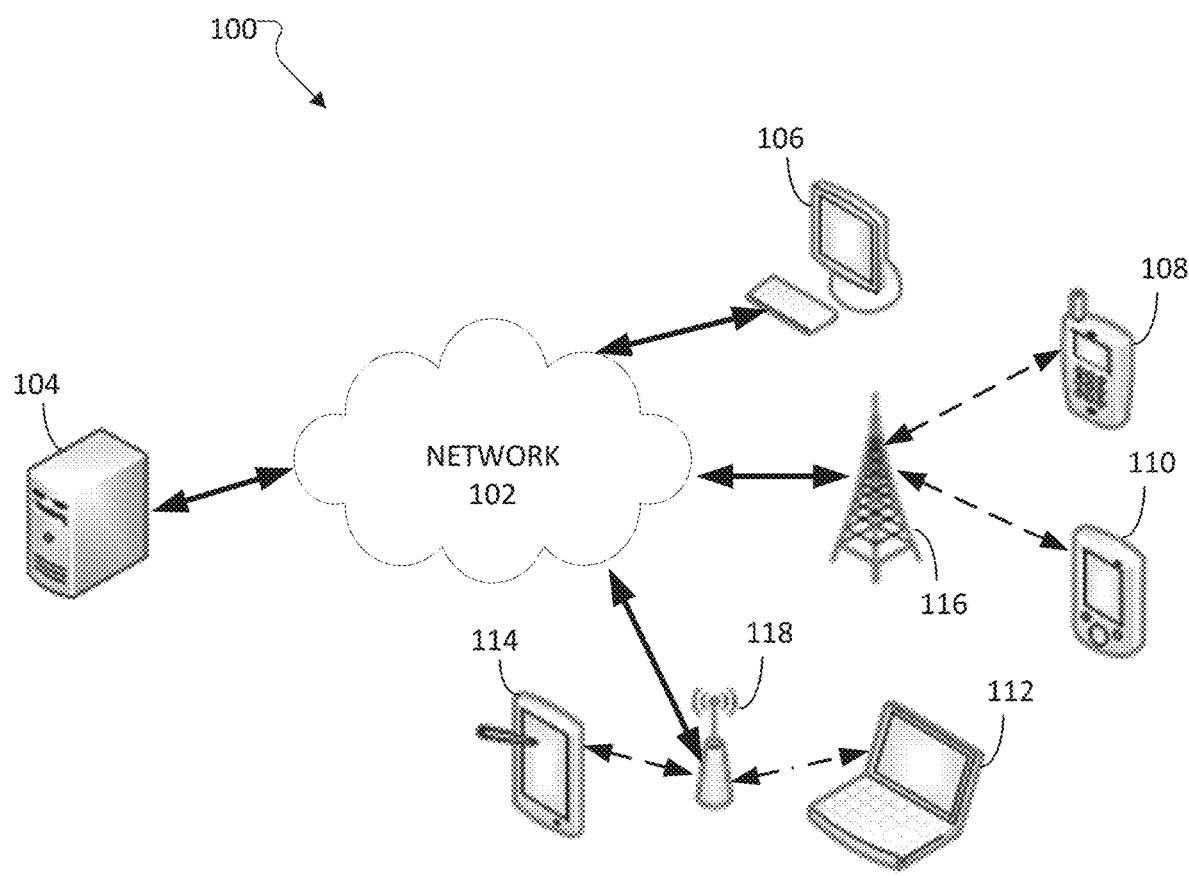
FIG. 1 illustrates an example communication system according to embodiments of this disclosure.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-114. The client devices 106-114 may be, for example, a smartphone (such as a UE), a tablet computer, a laptop, a personal computer, a wearable device, a head mounted display, or the like. The server 104 can represent one or more servers. Each server 104 includes any suitable computing or processing device that can provide computing services for one or more client devices, such as the client devices 106-114. Each server 104 could, for example, include one or more processing devices, one or more memories storing instructions and data, and one or more network interfaces facilitating communication over the network 102.

Each of the client devices 106-114 represent any suitable computing or processing device that interacts with at least one server (such as the server 104) or other computing device(s) over the network 102. The client devices 106-114 include a desktop computer 106, a mobile telephone or mobile device 108 (such as a smartphone), a PDA 110, a laptop computer 112, and a tablet computer 114. However, any other or additional client devices could be used in the communication system 100, such as wearable devices. Smartphones represent a class of mobile devices 108 that are handheld devices with mobile operating systems and integrated mobile broadband cellular network connections for voice, short message service (SMS), and Internet data communications. In certain embodiments, any of the client devices 106-114 can perform processes for setting up a RF based robot localization.

In this example, some client devices 108-114 communicate indirectly with the network 102. For example, the mobile device 108 and PDA 110 communicate via one or more base stations 116, such as cellular base stations or eNodeBs (eNBs) or gNodeBs (gNBs). Also, the laptop computer 112 and the tablet computer 114 communicate via one or more wireless access points 118, such as IEEE 802.11 wireless access points. Note that these are for illustration only and that each of the client devices 106-114 could communicate directly with the network 102 or indirectly with the network 102 via any suitable intermediate device(s) or network(s). In certain embodiments, any of the client devices 106-114 transmit information securely and efficiently to another device, such as, for example, the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
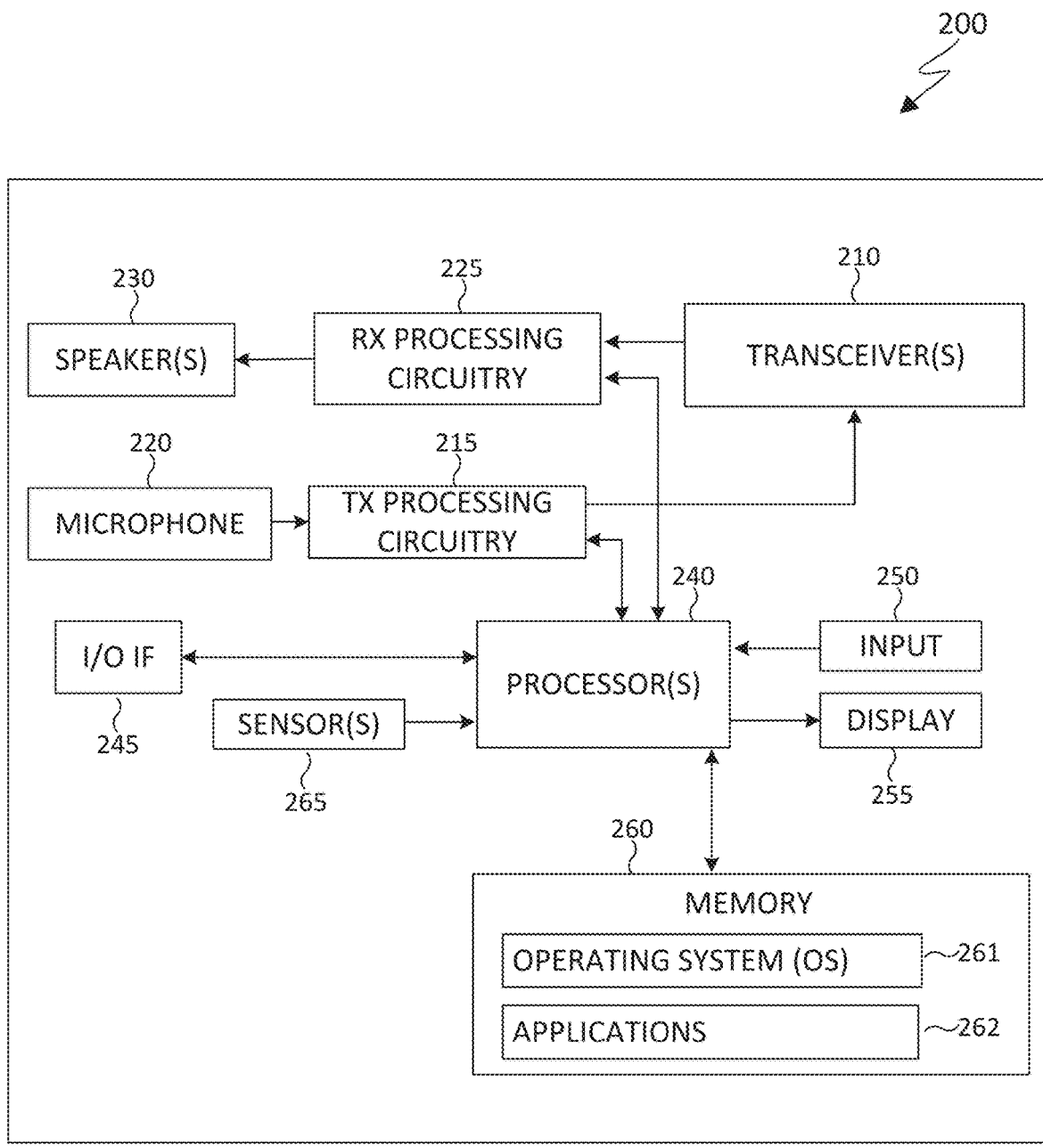
FIG. 2 illustrates an example electronic device according to embodiments of this disclosure.

FIG. 2 illustrates an example electronic device in accordance with an embodiment of this disclosure. In particular, FIG. 2 illustrates an example electronic device 200, and the electronic device 200 could represent the server 104 or one or more of the client devices 106-114 in FIG. 1. The electronic device 200 can be a mobile communication device, such as, for example, a UE, a mobile station, a subscriber station, a wireless terminal, a desktop computer (similar to the desktop computer 106 of FIG. 1), a portable electronic device (similar to the mobile device 108, the PDA 110, the laptop computer 112, or the tablet computer 114 of FIG. 1), a robot, and the like.

As shown in FIG. 2, the electronic device 200 includes transceiver(s) 210, transmit (TX) processing circuitry 215, a microphone 220, and receive (RX) processing circuitry 225. The transceiver(s) 210 can include, for example, a RF transceiver, a BLUETOOTH transceiver, a WiFi transceiver, a ZIGBEE transceiver, an infrared transceiver, and various other wireless communication signals. The electronic device 200 also includes a speaker 230, a processor 240, an input/output (I/O) interface (IF) 245, an input 250, a display 255, a memory 260, and a sensor 265. The memory 260 includes an operating system (OS) 261, and one or more applications 262.

The transceiver(s) 210 can include an antenna array including numerous antennas. For example, the transceiver(s) 210 can be equipped with multiple antenna elements. There can also be one or more antenna modules fitted on the terminal where each module can have one or more antenna elements. The antennas of the antenna array can include a radiating element composed of a conductive material or a conductive pattern formed in or on a substrate. The transceiver(s) 210 transmit and receive a signal or power to or from the electronic device 200. The transceiver(s) 210 receives an incoming signal transmitted from an access point (such as a base station, WiFi router, or BLUETOOTH device) or other device of the network 102 (such as a WiFi, BLUETOOTH, cellular, 5G, LTE, LTE-A, WiMAX, or any other type of wireless network). The transceiver(s) 210 down-converts the incoming RF signal to generate an intermediate frequency or baseband signal. The intermediate frequency or baseband signal is sent to the RX processing circuitry 225 that generates a processed baseband signal by filtering, decoding, and/or digitizing the baseband or intermediate frequency signal. The RX processing circuitry 225 transmits the processed baseband signal to the speaker 230 (such as for voice data) or to the processor 240 for further processing (such as for web browsing data).

The TX processing circuitry 215 receives analog or digital voice data from the microphone 220 or other outgoing baseband data from the processor 240. The outgoing baseband data can include web data, e-mail, or interactive video game data. The TX processing circuitry 215 encodes, multiplexes, and/or digitizes the outgoing baseband data to generate a processed baseband or intermediate frequency signal. The transceiver(s) 210 receives the outgoing processed baseband or intermediate frequency signal from the TX processing circuitry 215 and up-converts the baseband or intermediate frequency signal to a signal that is transmitted.

The processor 240 can include one or more processors or other processing devices. The processor 240 can execute instructions that are stored in the memory 260, such as the OS 261 in order to control the overall operation of the electronic device 200. For example, the processor 240 could control the reception of forward channel signals and the transmission of reverse channel signals by the transceiver(s) 210, the RX processing circuitry 225, and the TX processing circuitry 215 in accordance with well-known principles. The processor 240 can include any suitable number(s) and type(s) of processors or other devices in any suitable arrangement. For example, in certain embodiments, the processor 240 includes at least one microprocessor or microcontroller. Example types of processor 240 include microprocessors, microcontrollers, digital signal processors, field programmable gate arrays, application specific integrated circuits, and discrete circuitry. In certain embodiments, the processor 240 can include a neural network.

The processor 240 is also capable of executing other processes and programs resident in the memory 260, such as operations that receive and store data. The processor 240 can move data into or out of the memory 260 as required by an executing process. In certain embodiments, the processor 240 is configured to execute the one or more applications 262 based on the OS 261 or in response to signals received from external source(s) or an operator. For example, applications 262 can include a multimedia player (such as a music player or a video player), a phone calling application, a virtual personal assistant, and the like.

The processor 240 is also coupled to the I/O interface 245 that provides the electronic device 200 with the ability to connect to other devices, such as client devices 106-114. The I/O interface 245 is the communication path between these accessories and the processor 240.

The processor 240 is also coupled to the input 250 and the display 255. The operator of the electronic device 200 can use the input 250 to enter data or inputs into the electronic device 200. The input 250 can be a keyboard, touchscreen, mouse, track ball, voice input, or other device capable of acting as a user interface to allow a user to interact with the electronic device 200. For example, the input 250 can include voice recognition processing, thereby allowing a user to input a voice command. In another example, the input 250 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 250 can be associated with the sensor(s) 265, a camera, and the like, which provide additional inputs to the processor 240. The input 250 can also include a control circuit. In the capacitive scheme, the input 250 can recognize touch or proximity.

The display 255 can be a liquid crystal display (LCD), light-emitting diode (LED) display, organic LED (OLED), active matrix OLED (AMOLED), or other display capable of rendering text and/or graphics, such as from websites, videos, games, images, and the like. The display 255 can be a singular display screen or multiple display screens capable of creating a stereoscopic display. In certain embodiments, the display 255 is a heads-up display (HUD).

The memory 260 is coupled to the processor 240. Part of the memory 260 could include a RAM, and another part of the memory 260 could include a Flash memory or other ROM. The memory 260 can include persistent storage (not shown) that represents any structure(s) capable of storing and facilitating retrieval of information (such as data, program code, and/or other suitable information). The memory 260 can contain one or more components or devices supporting longer-term storage of data, such as a read only memory, hard drive, Flash memory, or optical disc.

The electronic device 200 further includes one or more sensors 265 that can meter a physical quantity or detect an activation state of the electronic device 200 and convert metered or detected information into an electrical signal. For example, the sensor 265 can include one or more buttons for touch input, a camera, a gesture sensor, optical sensors, cameras, one or more inertial measurement units (IMUs), such as a gyroscope or gyro sensor, and an accelerometer. The sensor 265 can also include an air pressure sensor, a magnetic sensor or magnetometer, a grip sensor, a proximity sensor, an ambient light sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 265 can further include control circuits for controlling any of the sensors included therein. Any of these sensor(s) 265 may be located within the electronic device 200 or within a secondary device operably connected to the electronic device 200.

Although FIG. 2 illustrates one example of electronic device 200, various changes can be made to FIG. 2. For example, various components in FIG. 2 can be combined, further subdivided, or omitted and additional components can be added according to particular needs. As a particular example, the processor 240 can be divided into multiple processors, such as one or more central processing units (CPUs), one or more graphics processing units (GPUs), one or more neural networks, and the like. Also, while FIG. 2 illustrates the electronic device 200 configured as a mobile telephone, tablet, or smartphone, the electronic device 200 can be configured to operate as other types of mobile or stationary devices.

As discussed above, autonomous service robots, such as vacuum cleaners and lawn mowers, have gained popularity in home and business environments in recent years. Early generations of such robots used simple controls, such as moving until the robot bumps into a wall or another obstacle, and then turning. For some robots such as lawn mowers, the bump-and-turn can be a dangerous strategy, as it might cause damage to property and/or the robot itself. Thus, additional sensors (e.g., camera, grass sensor, etc.) or infrastructure (a buried boundary wire with DC voltage) may be used to minimize or avoid dangerous situations.

One drawback for using boundary wires is that such a system requires the whole service area of the robot to be one connected zone. However, this is sometimes not feasible because of features that interrupt the service area (e.g., a road, sidewalk, or driveway that cuts through the service area, such as a lawn). The conventional way to mitigate this issue is to use other sensors (e.g., cameras, etc.) to reliably detect the area within the boundary that should not be mowed.

Thus, methods that only use boundary sensing are not efficient and provide no guarantee for complete coverage. To cover the whole service area efficiently and thoroughly, the robot requires good knowledge of the service area definition (e.g., a service area map) and its own location within the map (e.g., localization). Such information could then be used for path planning and path execution.

To address these and other issues, this disclosure provides systems and methods for setting up a RF based robot localization. As described in more detail below, the disclosed embodiments include a robot that is capable of localizing itself using multiple sensors, including one or more ultra-wideband (UWB) sensors, one or more inertial measurement units (IMUs), and one or more optical sensors. In some embodiments, the robot is a lawn mowing robot that automatically navigates and mows grass in a service area having one or more lawns or zones. To achieve this objective, the disclosed embodiments build knowledge about the service area, store this information, and allow the robot to infer its own position within the service area (i.e., self-localize in the environment).

In some embodiments, the robot is able to plan paths within the service area based on one or more optimization criteria (such as time and power) and follow the paths for mowing the grass in the service area. The robot can also know the location of a charging station in the environment and be able to navigate to the charging station as needed. Furthermore, the disclosed embodiments can detect any changes-either in the environment or in the system configuration (i.e., position of the static sensors)—that can adversely affect the performance of the robot and notify the user.

Additionally, the disclosed embodiments can also recommend system configurations that could improve the performance of the system in certain environments. Similarly, the robot is able to actively detect obstacles and changes in its environment during its operation and appropriately respond. Finally, the user is able to easily install and set up the system for optimal operation based on feedbacks, suggestions, and guidance from the system via an intuitive user-interface.

Note that while some of the embodiments discussed below are described in the context of robotic lawn mowers capable of mowing grass in a service area, these are merely examples. It will be understood that the principles of this disclosure may be implemented in any number of other suitable contexts or systems, including other home or industrial automation systems.

Figure 3:
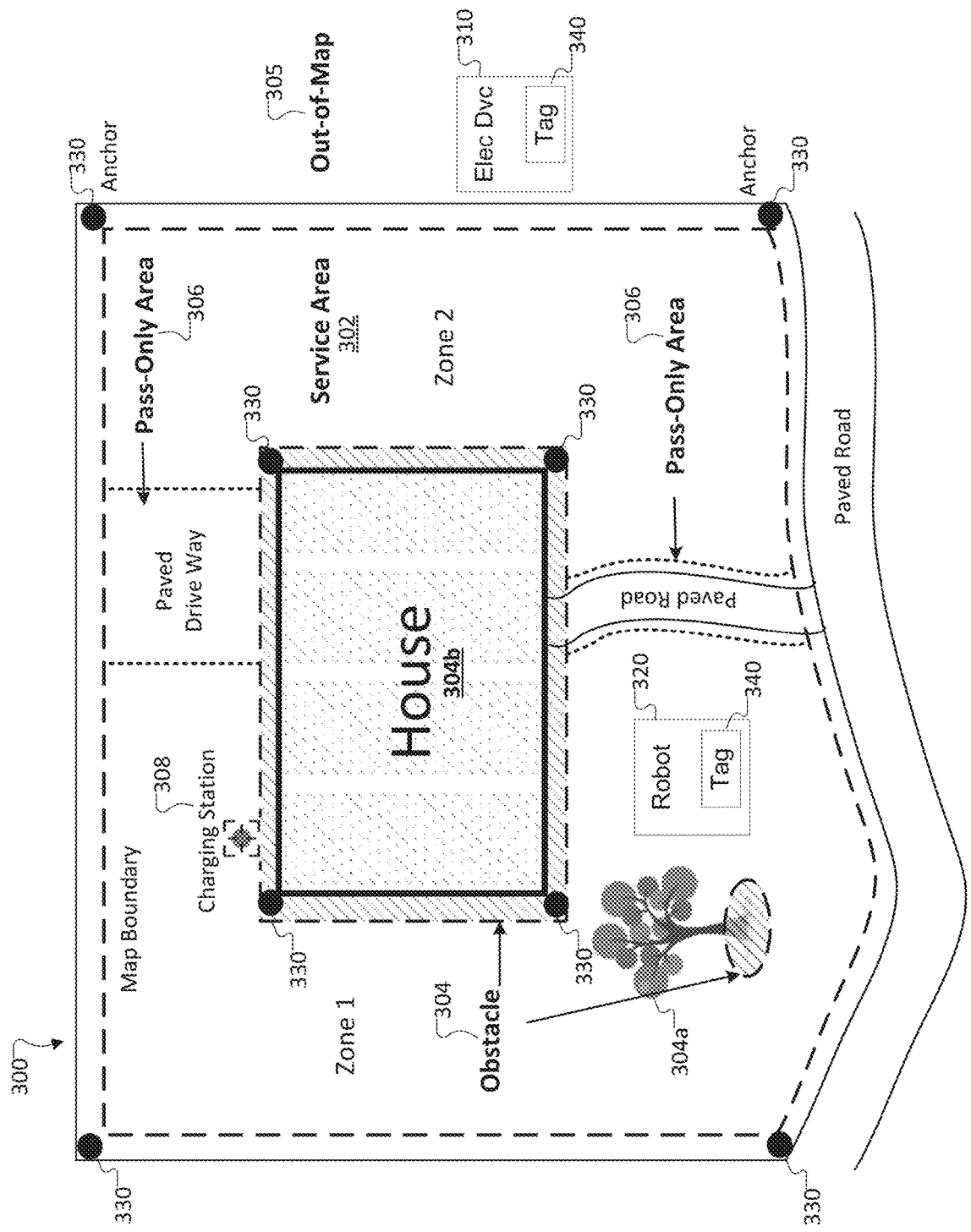
FIG. 3 illustrates an example system for setting up a RF based robot localization according to embodiments of the present disclosure.

FIG. 3 illustrates an example system 300 for setting up a RF based robot localization according to embodiments of the present disclosure. For ease of explanation, the system 300 will be described as including one or more components of the communication system 100 of FIG. 1, such as the client devices 106-114; however, the system 300 could be performed using any other suitable device or system. The embodiment of the system 300 shown in FIG. 3 is for illustration only. Other embodiments of the system 300 could be used without departing from the scope of this disclosure.

As shown in FIG. 3, the system 300 includes a service area 302, an electronic device 310, a robot 320, and multiple anchors 330.

The service area 302 is a geographical area in which the robot 320 moves while performing one or more functions. In the system 300, the service area 302 represents a lawn that is to be mowed by the robot 320. Excluded from the service area 302 are one or more obstacles 304 (such as trees 304a, a house 304b, a sculpture, a pool, a fountain, and the like) and an out-of-map area 305. The robot 320 is trained to avoid entering (or trying to enter) the out-of-map area 305 and the areas occupied by the obstacles 304. The service area 302 can also include one or more pass-only areas 306, which are areas that are safe for the robot 320 to pass through but should not perform service. The pass-only areas 306 could include a driveway or sidewalk in the service area 302. If the service area 302 is separated by the pass-only areas 306 into different zones, the pass-only areas 306 could link the zones together and create a viable path.

The electronic device 310 is a wireless handheld device that can be used for teaching the boundaries of the service area 302 to the system 300. In some embodiments, the electronic device 310 is a personal consumer device, such as a smart phone or tablet. The electronic device 310 may represent (or be represented by) one of the client devices 106-114.

The robot 320 is a wireless communication-enabled device capable of moving around the service area 302 and performing one or more functions, such as mowing grass, spraying fertilizer, and the like. As described earlier, the robot 320 can be a lawn-mowing robot, although this is merely one example, and other types of robots are within the scope of this disclosure.

The anchors 330 include UWB sensors (or other types of RF sensors) and are placed in fixed locations throughout the service area 302 to provide reference for localization and for determining the service area 302. To generate unique reference about the localization, the system 300 may include three or more anchors 330, as described in greater detail below.

Each of the electronic device 310 and the robot 320 can include one or more tags 340. The tags 340 are UWB sensors that are installed in (or otherwise connected to) the electronic device 310 and the robot 320 and enable UWB communication with the anchors 330. In UWB based localization, the tags 340 are used to localize the electronic device 310 or the robot 320 in the environment using the reference information provided by the anchors 330. In some embodiments, the electronic device 310 may not include a built-in tag 340 (such as when the electronic device 310 is a smart phone or tablet that is not configured for UWB communication).

In some embodiments, the system 300 is capable of generating a map of the service area 302 based on obtained location information. In some embodiments, the service area 302 can be annotated with different categories, such as one or more keep-out areas (i.e., the obstacles 304) and one or more pass-only areas 306. The map can also identify the location of a charging station 308, to which the robot 320 can return for charging.

Figure 4:
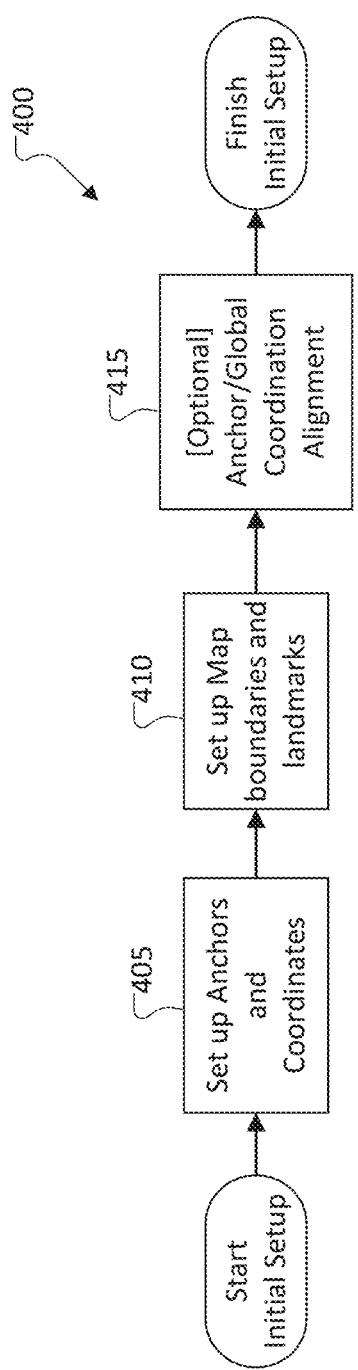
FIG. 4 illustrates an example process for initial setup for UWB based robot localization according to embodiments of the present disclosure.

FIG. 4 illustrates an example process 400 for initial setup for UWB based robot localization according to embodiments of the present disclosure. For ease of explanation, the process 400 will be described as being performed using the system 300 of FIG. 3; however, the process 400 could be performed by any other suitable device or system. The embodiment of the process 400 shown in FIG. 4 is for illustration only. Other embodiments of the process 400 could be used without departing from the scope of this disclosure.

As shown in FIG. 4, the process 400 includes multiple steps. At step 405, the anchors 330 are set up and anchor coordinates are established. At step 410, the anchors 330 and the tags 340 are used to mark the different boundaries and landmarks in the map. Optionally, at step 415, the anchor coordinates are aligned with global coordinates. Further details of the process 400 are provided below.

Figure 5:
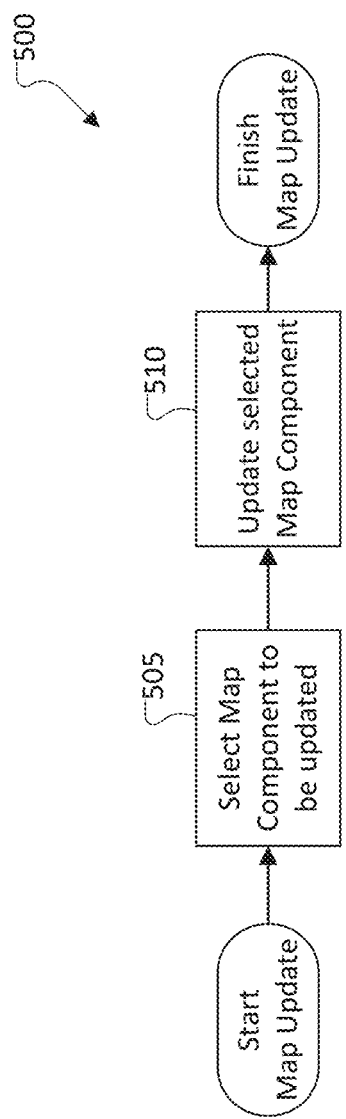
FIG. 5 illustrates an example process for map updating for UWB based robot localization according to embodiments of the present disclosure.

After the initial setup process 400, a map update process can be performed as needed or desired. FIG. 5 illustrates an example process 500 for map updating for UWB based robot localization according to embodiments of the present disclosure. For ease of explanation, the process 500 will be described as being performed using the system 300 of FIG. 3; however, the process 500 could be performed by any other suitable device or system. The embodiment of the process 500 shown in FIG. 5 is for illustration only. Other embodiments of the process 500 could be used without departing from the scope of this disclosure.

As shown in FIG. 5, the process 500 can be performed to update certain boundaries or landmarks in the map. At step 505, one or more map components to be updated are selected. At step 510, the selected map component(s) are updated. Further details of the process 500 are provided below.

Figure 8:
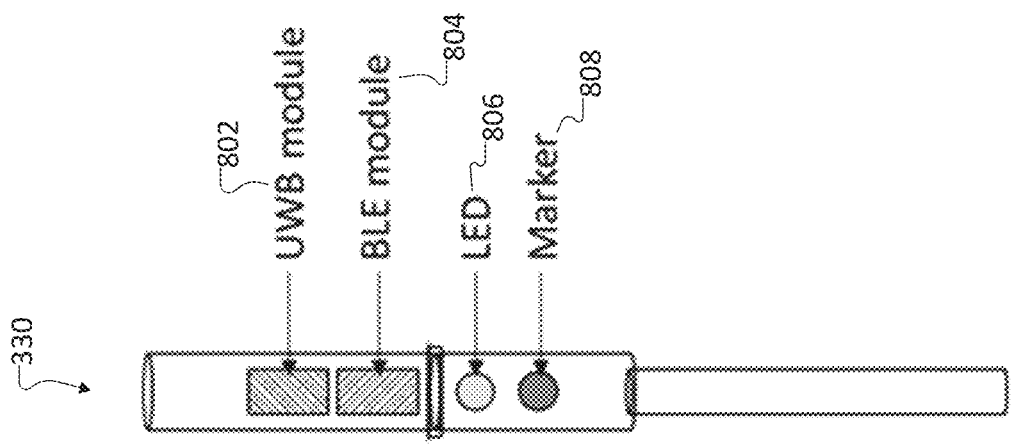
FIGS. 6 through 8 illustrate different configurations for an anchor according to embodiments of the present disclosure.
Figure 7:
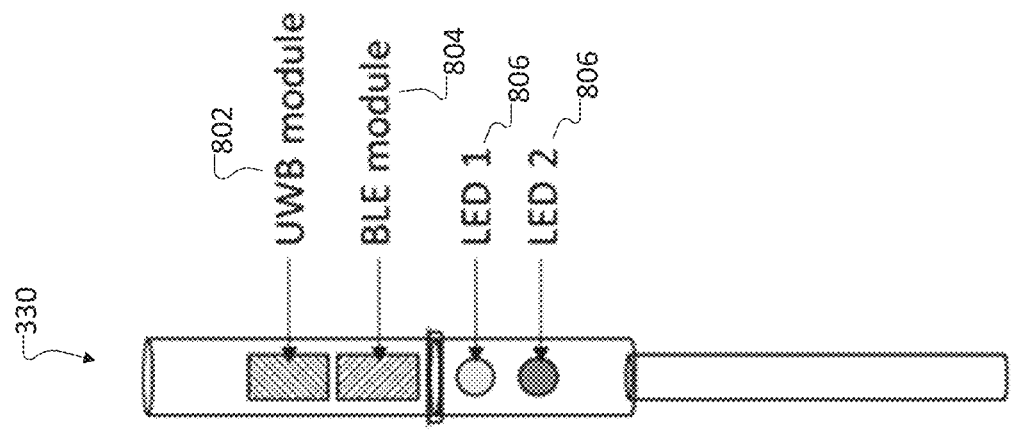
Figure 6:
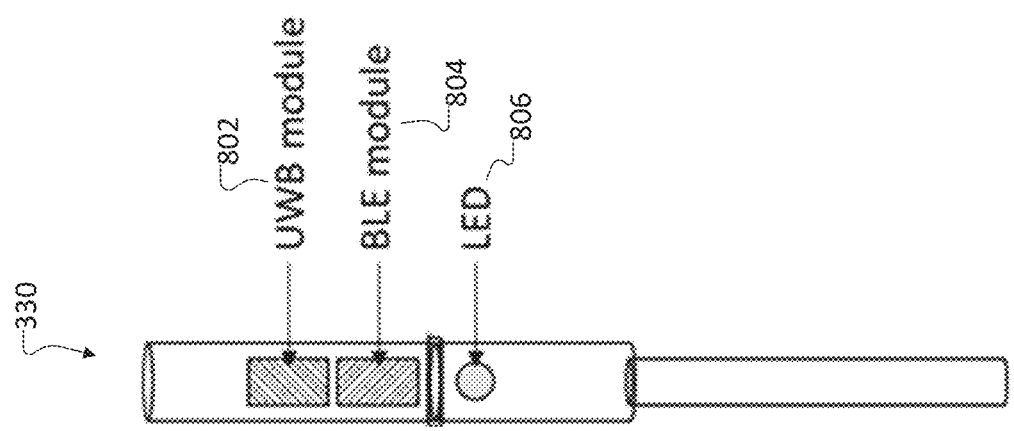

In some embodiments, the anchors 330 are encased in, or mounted to, one or more structures (e.g., a pole) that can be easily installed around the service area 302. It is noted that terms "anchors," "anchor poles," and "beacon poles" are used interchangeably in this disclosure. FIGS. 6 through 8 show a few different configurations for the anchor 330 according to embodiments of the present disclosure. As shown in FIGS. 6 through 8, the anchor 330 includes a UWB module 802 that enables UWB communication with the electronic device 310 and the robot 320. The anchor 330 also includes a secondary RF module 804 that can be used to create a secondary wireless network for communication of data and commands between the anchors 330 and the tags 340. Consequently, the devices containing the tags 340 (e.g., the electronic device 310 and the robot 320) also contain compatible RF modules. In one embodiment, the secondary RF modules 804 are Bluetooth Low Energy (BLE) modules. Other embodiments may employ a secondary Wi-Fi network for the communication of data and commands between the anchors 330 and the tags 340.

Additionally, the anchors 330 can have one or more LEDs 806, as shown in FIGS. 6 through 8. The LED(s) 806 can be used to show a power ON or OFF state of the anchor 330. Additionally, the LED(s) 806 may be used to distinguish one anchor 330 from another, for example using different colors that impose sequence ordering for the anchors 330. In some embodiments, if at least two LEDs 806 are used, one of the LEDs 806 could be used to indicate the power ON or OFF state of the anchor 330, and the second LED 806 could be used to emit a particular color designated for the anchor 330 during the setup process. When the anchor 330 contains a single LED 806, the color of the LED 806 could be used to associate a specific anchor 330, and the power ON or OFF state of the anchor 330 is indicated by the ON or OFF state of the LED 806, irrespective of the color. Additionally, or alternatively, in some embodiments, a marker 808 (shown in FIG. 8) may be used to designate the anchor numbers. The marker 808 may be attached to the anchor poles during the initial setup. Examples of such markers 808 include (but are not limited to) stickers of numbers, colors, sets of dots, and the like.

In addition to indicating the power state and anchor numbers, the LED(s) 806 may also be used to indicate if the anchor 330 is placed at a non-optimum position so that the user may move the anchor 330 to a better location. A non-optimum position is any location in the service area 302 where there is a potential for significant loss of the received signal strength transmitted from one or more locations in the service area 302, including from the locations of other anchors 330. The loss in the received signal strength could be caused by several factors, including (but not limited to) occlusions between the receiver and transmitter, such as buildings, trees, garden ornaments, and the like. Non-optimum locations could also arise as a result of large separation between the transmitter and the receiver, for example, if only a few anchors 330 are sparsely placed over a large lawn area.

Figure 9:
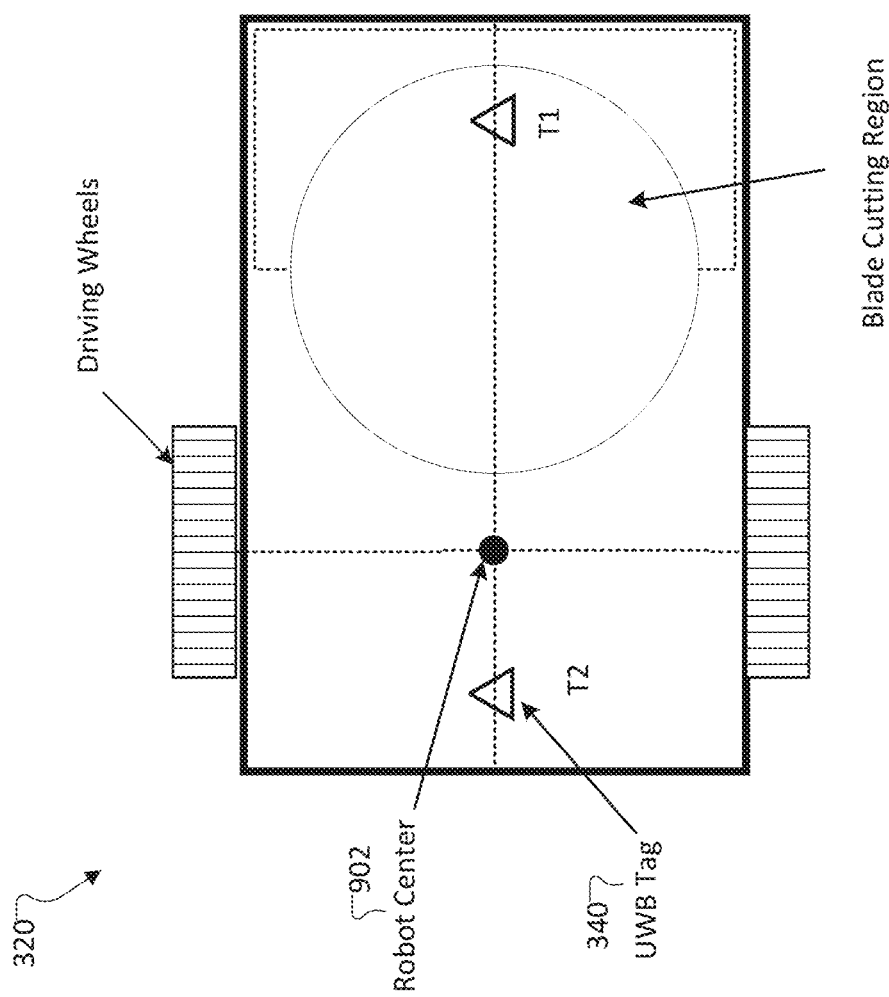
FIGS. 9 and 10 illustrate example diagrams of a UWB based robot according to embodiments of the present disclosure.
Figure 10:
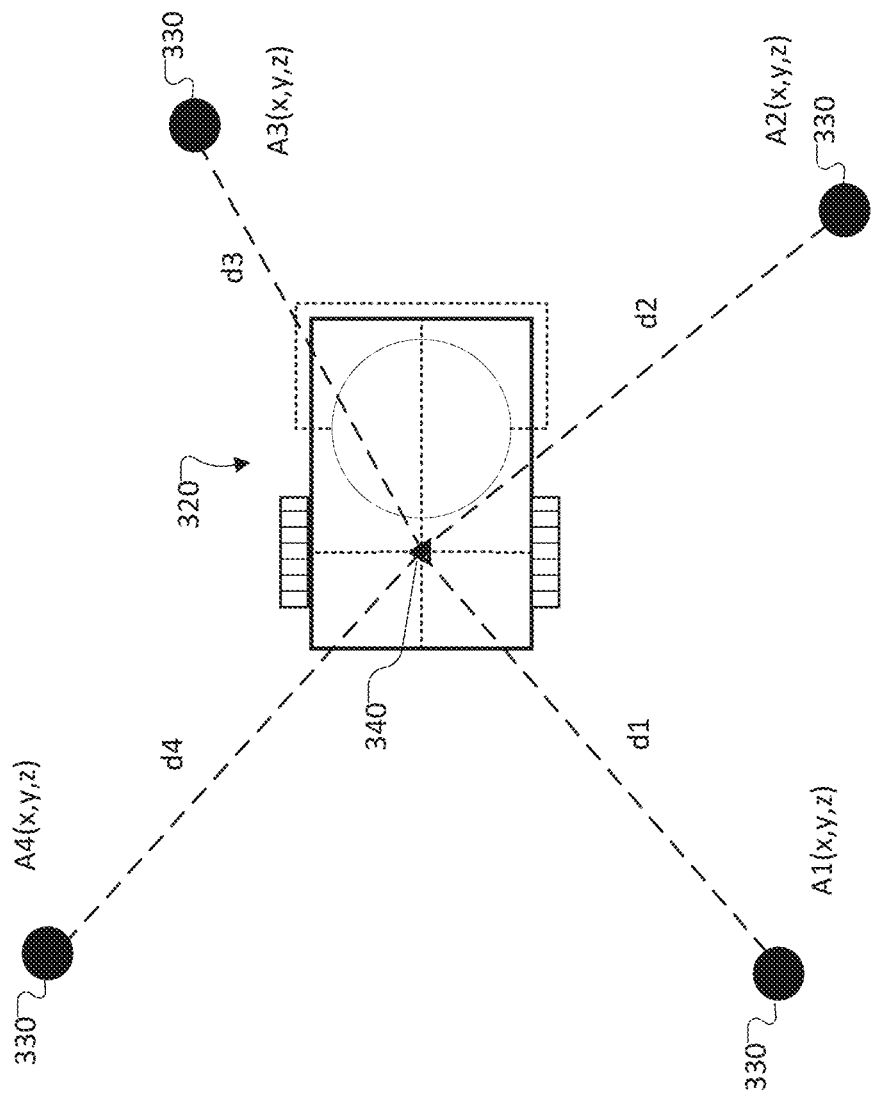

FIGS. 9 and 10 illustrate example diagrams of a UWB based robot 320 according to embodiments of the present disclosure. As shown in FIG. 9, the robot 320 includes a point identified as the robot center 902. The robot center 902 is often defined as the middle point of its driving wheel axle. The robot 320 also includes one or more UWB tags 340. There is no strict limitation on the number or placement of the tags 340. The location of each tag 340, the relative displacements ($\Delta x, \Delta y$) of the tag 340 from the robot center 902, and robot orientation information can be used to determine the location of the robot center 902. In some embodiments, two UWB tags 340 can be used on the robot 320 to obtain two location measurements (T1 and T2). In turn, these measurements can be used to obtain the location of the robot center 902 and UWB-based robot orientation measurement. This UWB-based measurement can then be fused with orientation from an IMU or other sensors to further improve localization accuracy. As shown in FIG. 10, in some embodiments, a UWB tag 340 can be placed above the robot center, in order to directly obtain the location of the robot 320.

Turning again to FIG. 4, the first step of the process 400 is step 405, in which the anchors 330 are set up and anchor coordinates are established. During step 405, a user physically places the anchors 330 in multiple locations around the service area 302. In some embodiments, a graphical user interface (GUI) based application is provided that can guide the user to set up the anchors 330. In some embodiments, the GUI application can be installed on the electronic device 310, which can be the user's smart phone. In other embodiments, the electronic device 310 is a portable handheld device with a screen to display the GUI and text elements to the user. Examples of such a portable handheld device could include a small device containing UWB and BLE sensors that is detachable from the robot 320 or the charging station 308. During the process 400, the user may use the detachable module for teaching the lawn boundaries to the system 300. Following setup, the detachable module can be attached back to the robot 320 or the charging station 308. Generally, if the detachable module is part of the robot 320, the UWB sensor in the module assumes the role of UWB tag during the initial setup and during regular mowing operation. On the other hand, if the detachable module is part of the charging station 308, the UWB sensor in the module assumes the role of UWB tag during the initial setup, but as UWB anchor during regular mowing operation when the detachable module is attached to the charging station 308. In such scenarios, the additional UWB anchor could improve the localization accuracy of the robot 320 in the presence of occlusions.

In some embodiments, both a smart phone and a (separate) detachable module may be used together for initial setup. While the UWB sensor in the detachable module is configured as a UWB tag for localizing the detachable module with respect to the anchors 330, the user interacts with the system 300 via the GUI application running on the smart phone as described later. In these scenarios, the detachable module may not include a separate screen since the user may interact with the GUI application via the smart phone display. Moreover, in these scenarios, it is not necessary to use a UWB-enabled smart phone. In addition to displaying the GUI to the user, the smart phone may be used to collect other data such as video, image, IMU, and GPS data streams that may be associated with the corresponding UWB-based location data simultaneously calculated in the detachable device. Data and notifications may be exchanged between the detachable device and the smart phone via wired (e.g., USB, etc.) or wireless links (e.g., BLE, Wi-Fi, NFC (near field communication), etc.).

There are different techniques that can be used to select locations of the anchors 330 in the service area 302. One method is to ensure the service area 302 can be covered with four anchors, with at least three anchors in the direct line-of-sight (LoS) with the UWB tag at all times. Additional anchors 330 may be added to the service area 302 if a complete LoS blockage is expected, e.g., due to a concrete wall or other obstacles. Note that the underlying mechanism of anchor position determination and tag localization described in the following paragraphs does not change if more than four anchors are employed in the service area.

Figure 11:
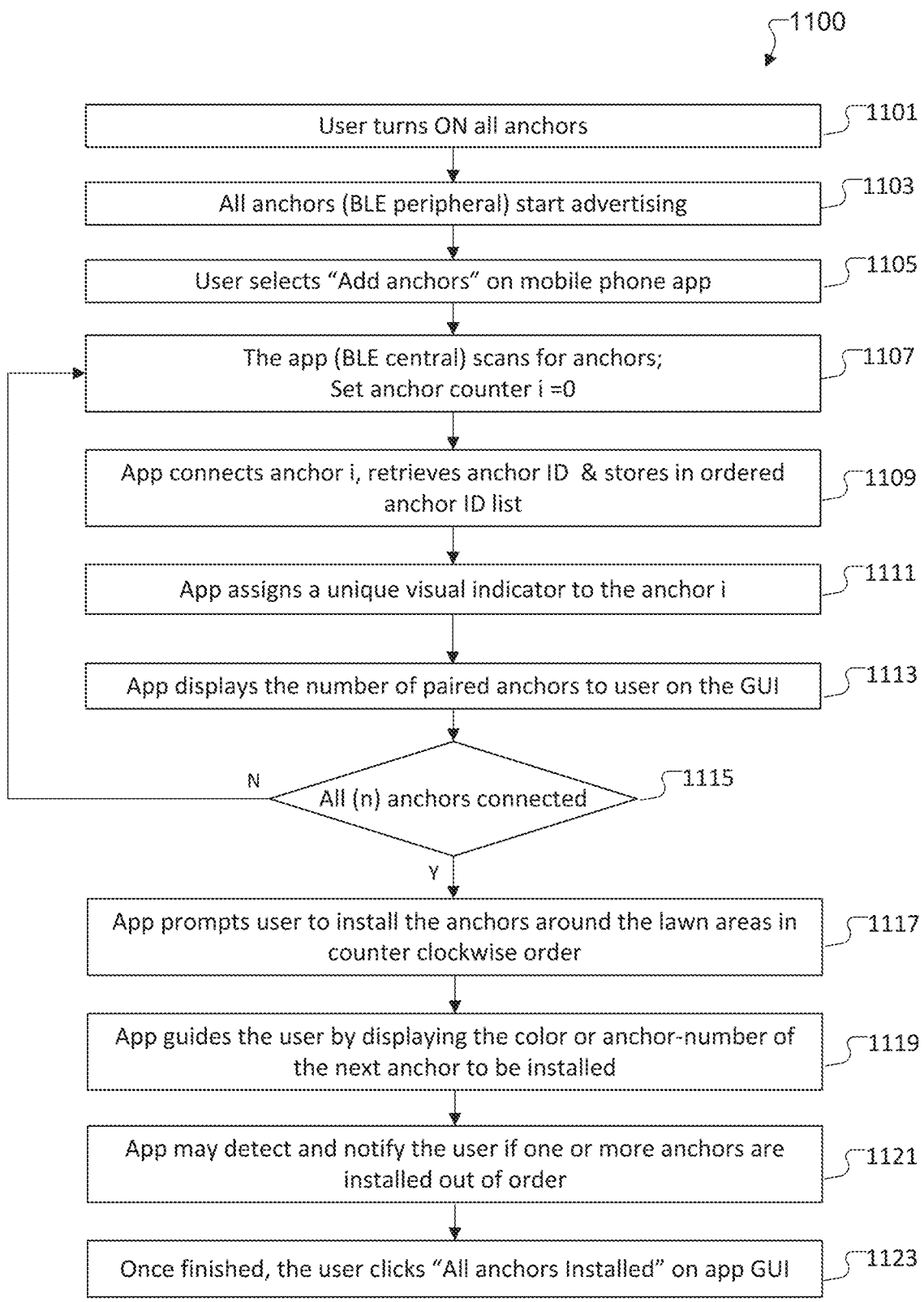
FIG. 11 illustrates an example process for installing anchors around a service area according to embodiments of the present disclosure.

FIG. 11 illustrates an example process 1100 for installing anchors around a service area according to embodiments of the present disclosure. The process 1100 can represent at least a portion of step 405 of FIG. 4. As described in greater detail below, the process 1100 includes powering ON the anchors 330, registering the anchors 330 with the system application running on the electronic device 310, and physically installing the anchors 330 around the service area 302.

As shown in FIG. 11, the user initiates this process by invoking the application to scan for anchors 330. The application assumes the role of the BLE central device and starts scanning for the anchors 330. Once the user powers ON an anchor 330 (step 1101), the anchor 330 assumes the role of a BLE peripheral device and starts advertising (step 1103). Once discovered by the application, the one or more anchors 330 are shown to the user via the application GUI and the user is prompted to add the anchor 330 to the network (step 1105).

The application scans for the anchors 330 in a loop, where an anchor counter i is initialized to zero (step 1107). For each anchor 330 found in the scan, the application registers the anchor 330 by storing a unique anchor ID associated with the anchor 330 (step 1109). There are several ways of assigning and associating a unique anchor ID with an anchor 330. For example, the application may use the BLE address of the anchor 330 or a derivative of the BLE address obtained from the BLE advertisement packet as the anchor ID. Alternatively, the application may use a device ID assigned by the manufacturer, the MAC address, or any other Universally Unique Identifier (UUID) number provided by the anchor 330 to the application as a BLE service. The application maintains an ordered list containing the anchor IDs of the anchors 330 added to the network. Although by default, the anchors 330 are enumerated in the order of addition, the anchor orders may be reassigned by the user via the application GUI. In some embodiments, the application also assigns a unique visual indicator to each anchor 330 (step 1111). The application can display the number of paired anchors 330 on a GUI of the application (step 1113). The application checks to see if all anchors 330 are connected (step 1115), and if not, the process 1100 returns to step 1107.

Following the addition of all the anchors 330 to the network, the application may instruct the user to install the anchors 330 around the service area while maintaining the same order (step 1117). In some embodiments, the user installs the anchors 330 on the ground in a counter-clockwise fashion starting from anchor one—the first anchor 330 on the list. Imposing the ordering constraint while installing the anchors 330 helps the application to eliminate or reduce the ambiguity in the estimation of the three-dimensional positions of the anchors 330 from their pair-to-pair distance measurements as described in greater detail below.

To help the user to visually identify the anchors 330 and install them around the service area 302 in the correct order, the anchors 330 may include one or more distinctive perceptual features—such as visual, auditory, or tactile—that can be associated with the ordered list of anchors 330. In one embodiment, the user may attach numbered stickers or some other such distinctive attachable markers to each of the anchors 330 to maintain and enumerate the order in which they were registered with the application. For example, after adding the first anchor 330 to the network, the user may put a sticker marked "1" on the anchor 330; after adding the second anchor 330 to the network, the user could attach a sticker marked "2" on the anchor 330, and so on. Additionally, or alternately, the colors of the one or more LEDs 806 in an anchor 330 may be associated with the position of the anchor 330 in the ordered list. The application may render the anchors 330 on a map using the corresponding colors or visual features to provide visual feedback to the user about the locations of the individual anchors (step 1119).

The use of numbered stickers, color stickers, LED color, or any such indicators is employed to help the human user to visually distinguish, understand, and maintain the ordering of the anchors 330. As such, the application distinguishes the anchors 330 and associates their order by maintaining an ordered list of the anchor IDs. To maintain the association, the application may also add the corresponding colors, numbers, or any other such visually distinctive markers to the ordered list of anchor IDs. Additionally, to help the user during the anchor setup process, the application shall display the associated color or anchor number when displaying any information related to one or more anchors 330 on the GUI.

The application can detect and notify the user if one or more anchors 330 are installed out of order (step 1121). On finished, the user completes the installation, such as by clicking an "All anchors installed" button on the application GUI (step 1123).

Figure 12:
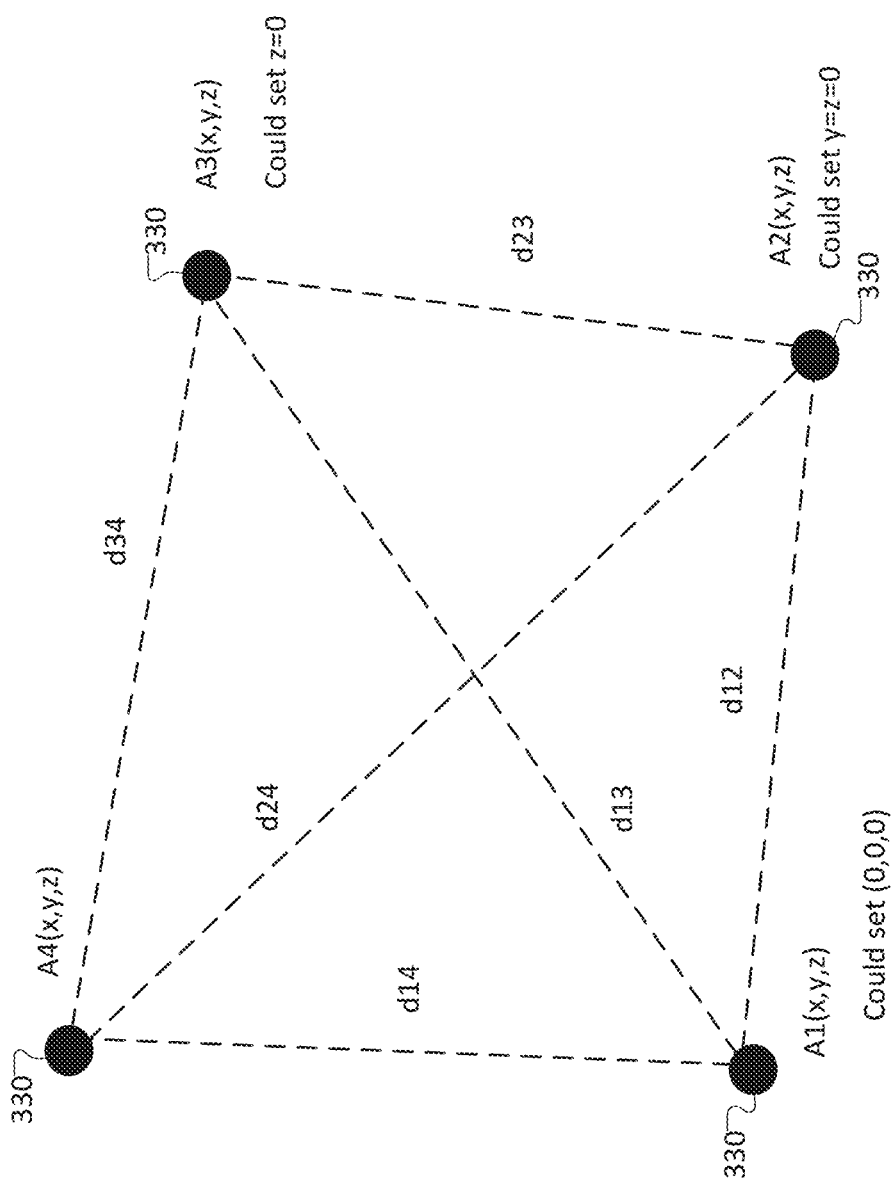
FIG. 12 shows an example arrangement of four anchors around a service area according to embodiments of the present disclosure.

The locations of the anchors 330 can be determined by the distance measurements between pairs of anchors 330. FIG. 12 shows an example arrangement of four anchors 330 around a service area according to embodiments of the present disclosure. For a four-anchor system, there are a total of $$\binom{4}{2} = 6$$

distances that can be measured: $d_{ij}$ where i, j∈ [1,4]. The relative location of the four anchors 330 can be estimated numerically using these distance measurements as illustrated in FIG. 12. The system application, also referred to as the "controller" in this document, can schedule the distance measurements and collect the data using UWB or side channels such as Bluetooth or Wi-Fi. Note that the controller or system application may run in both the handheld or detachable device (e.g., the application in the electronic device 310) and the robot 320.

Figure 13:
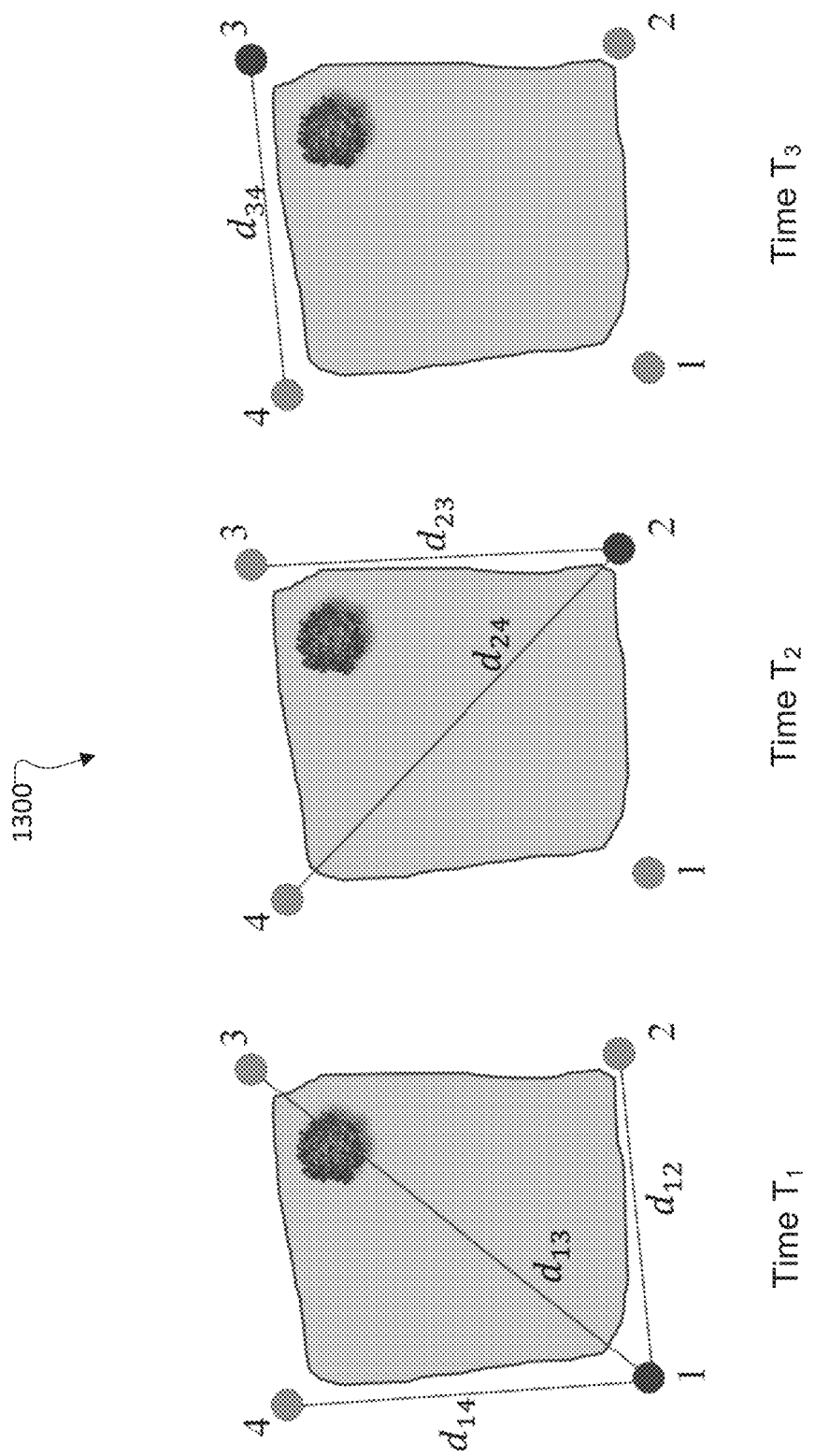
FIG. 13 illustrates an example process for a system application to schedule distance measurements in a system with four anchors, according to embodiments of the present disclosure.

FIG. 13 illustrates an example process 1300 for the system application to schedule the distance measurements in a system with four anchors. At time T1, the anchor 1 is assigned the role of initiator by the controller for UWB-based distance measurements using Double-Sided Two-Way Ranging (DS-TWR) while the other anchors act as responders. The measured distances $d_{12}$, $d_{13}$ and $d_{14}$—the pair-wise distances between anchors 1 and 2, anchors 1 and 3, and anchors 1 and 4, respectively—are obtained by averaging multiple pair-wise measurements between the anchor pairs and sent to the controller application over the BLE slide-link. At time T2, the anchor 2 is assigned as the initiator by the controller application, which obtains distance measurements $d_{24}$ and $d_{23}$, averages them, and sends them to the controller over the BLE slide-link. Finally, at time T3, the controller schedules the anchor 3 to be the initiator and 4 to be the responder. Multiple measurements $d_{34}$ between the anchors 3 and 4 are obtained, averaged and sent to the controller over the BLE side-link. Note that although FIG. 13 shows the use of BLE slide-link with a phone app running the controller application, other modes of side-link channels such as Wi-Fi may be used. Similarly, the robot 320 could execute the controller application, instead of a phone or detachable module, for orchestrating the anchor role assignments and pair-wise distance measurements.

Figure 14:
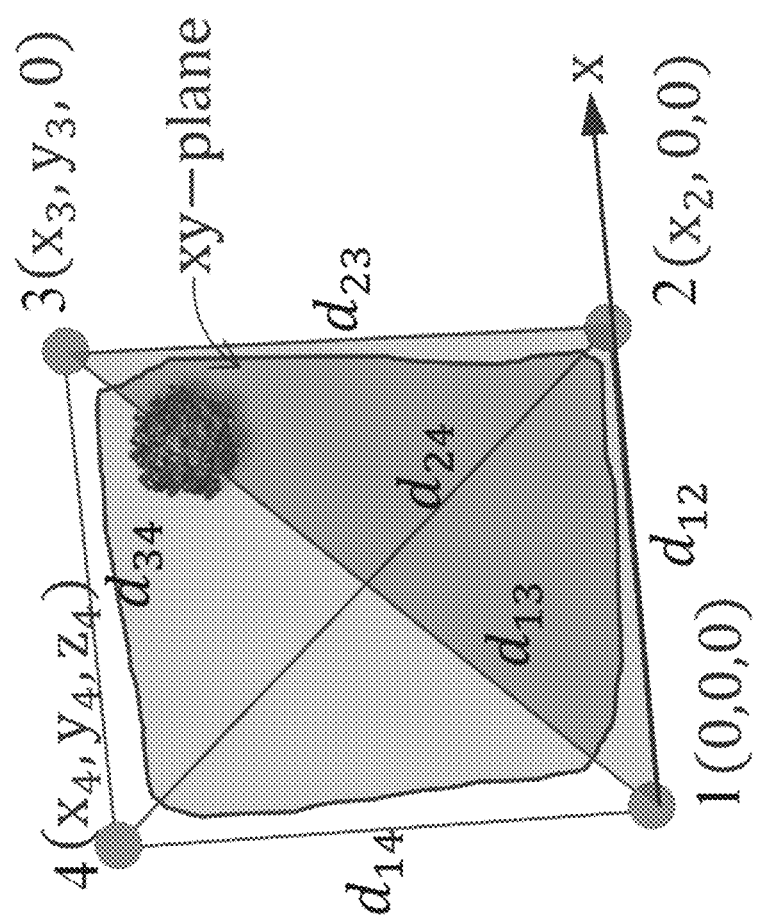
FIG. 14 illustrates a subset of anchor locations used to form a local coordinate system, according to embodiments of the present disclosure.

Once the controller or system application receives all the pair-wise distances between the anchors 330, the controller or system application can assign a coordinate system that is defined locally with respect to the anchors 330 and estimate the positions of the anchors 330 in that coordinate system. This represents a portion of step 405 of FIG. 4. In one embodiment, one of the anchors (1) is selected as origin of the coordinate system, the line between (1-2) is selected as x-axis, and the plane of 3 anchors (1-2-3) is selected as x-y plane, as illustrated in FIG. 14. This arrangement enables the controller to set up a system of equations relating the distances and the 3D coordinates and employ simple numerical techniques such as least squares optimization to compute the coordinates in the local coordinate system.

Figure 15:
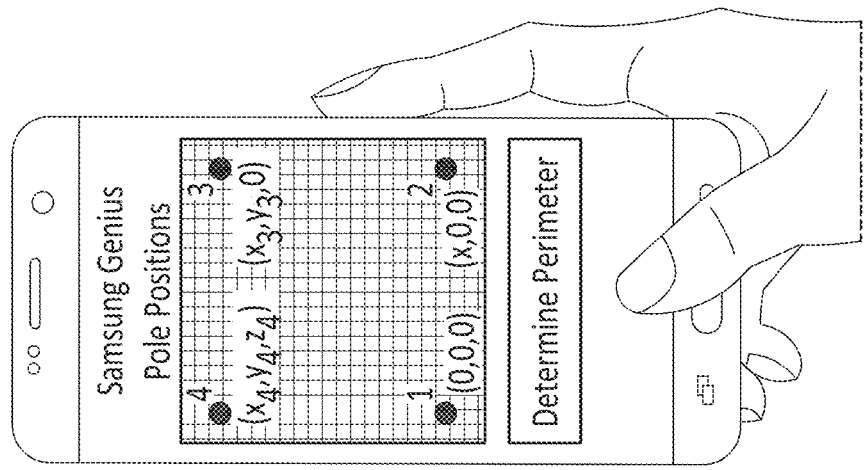
FIG. 15 illustrates an example of how anchors in the local coordinate system may be displayed to the user via an application GUI, according to embodiments of the present disclosure.
Figure 15:
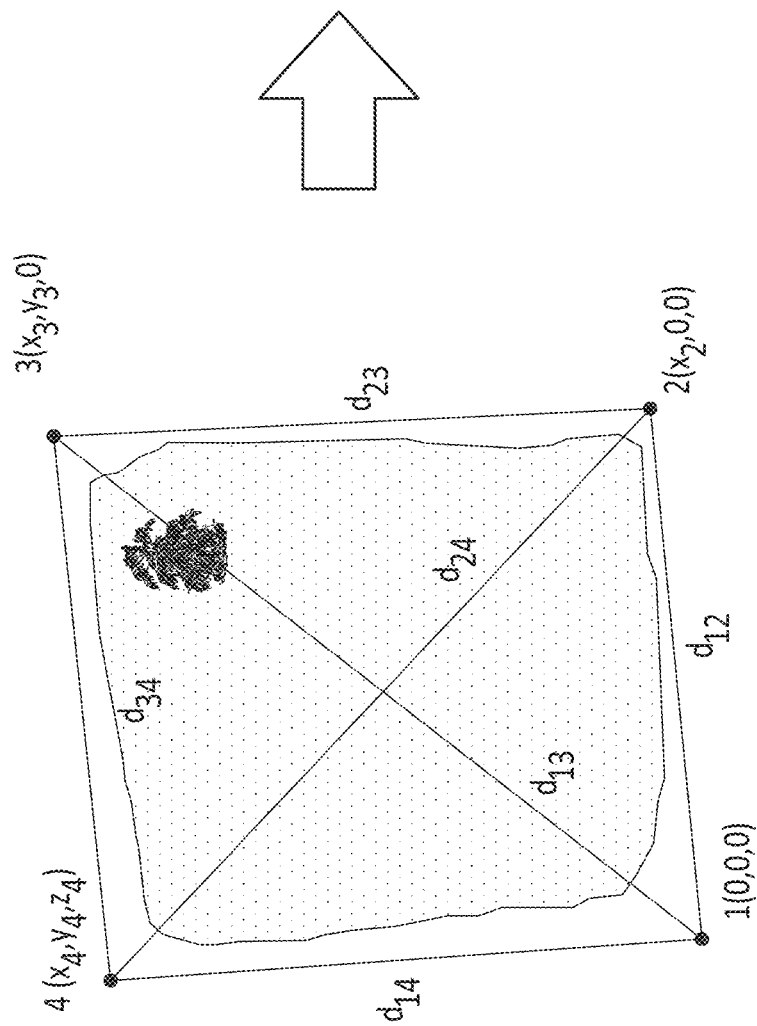

Following the computation of the anchor locations, the application can display the anchor locations to the user. The application may also display a 2D grid along with the anchors 330. In some embodiments, the orientation of the 2D grid could be aligned with the x-axis of the local coordinate system, that is, the line joining the anchors 1 and 2. Additionally, the anchors 330 may be rendered using the specific colors matching the LED(s) 806 of each anchor 330, as described earlier, to help the user visualize the positions of the anchors 330. FIG. 15 illustrates an example of how the anchors 330 in the local coordinate system may be displayed to the user via the application GUI. In the figure, the anchor 1 has the coordinate (0, 0, 0), the anchor 2 has the coordinates (x2, 0, 0) and the line 1-2 is aligned with the horizontal axis of the grid.

Figure 16:
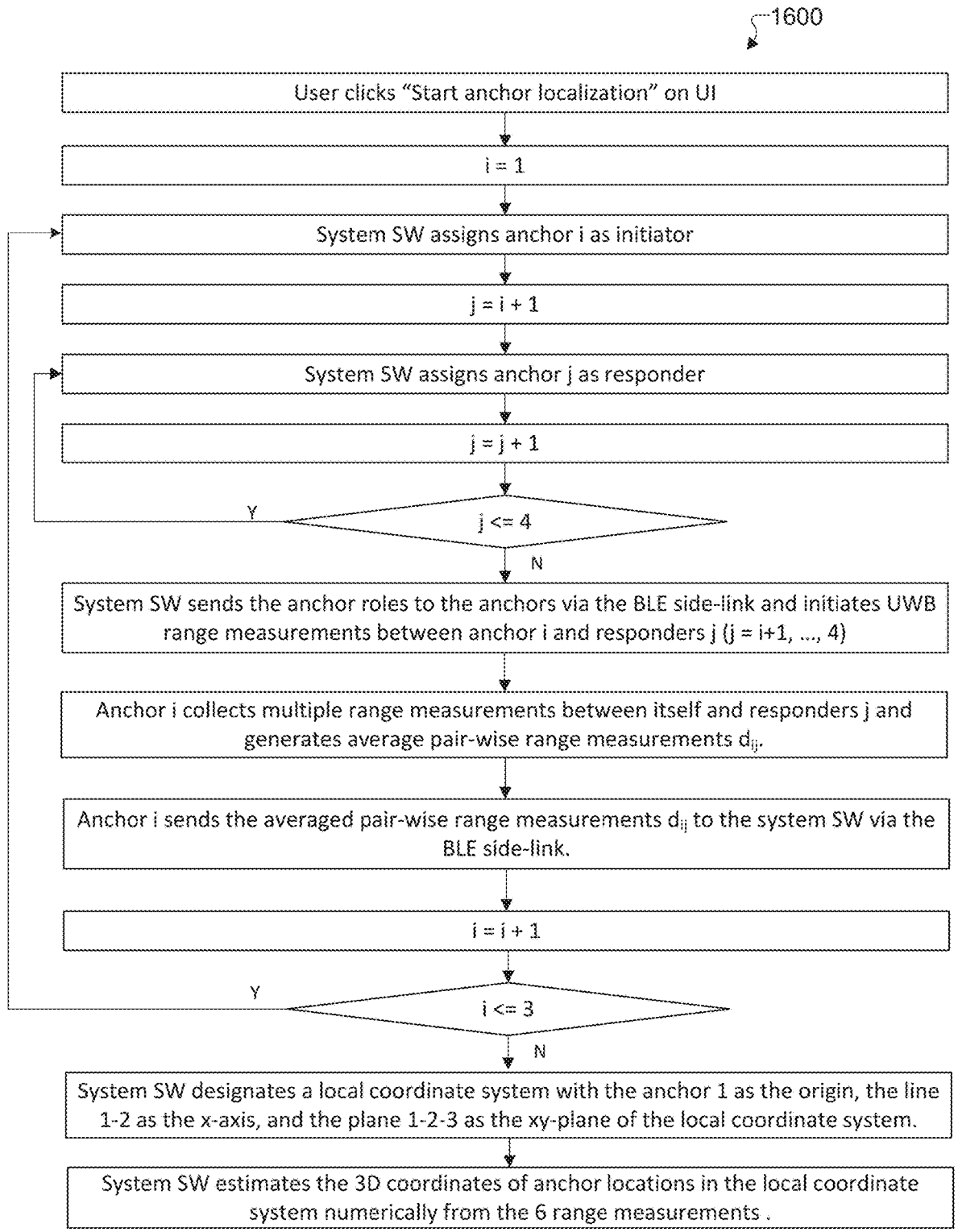
FIG. 16 illustrates a flowchart of a process for estimating anchor positions in the local coordinate system according to embodiments of the present disclosure.

FIG. 16 illustrates a flowchart of a process 1600 for estimating anchor positions in the local coordinate system according to embodiments of the present disclosure. The process 1600 is specific for an example case involving four anchors 330 around the lawn; however, the process 1600 can easily be adapted for a different number of anchors 330. The anchor self-localization can be initiated by the user by clicking on a button on the application UI after the user has installed the anchors 330 around the service area 302.

In some embodiments, the anchor positions may be transformed from the local coordinate system to a global coordinate system using techniques described later in this disclosure. Furthermore, the application may show anchors and their locations overlaid on a global map, such as a map obtained from a mapping service such as GOOGLE MAPS. The coordinate system choice does not affect the localization. Additional sensors (e.g., IMU, UWB, GPS, and the like) can be used to establish the coordinate transform.

As described above, the coordinate system for the anchors can be set at system setup time. However, the coordinate system may be changed based on user choice after deployment.

In other embodiments, one of the anchors 330 is selected as origin, a convenient orientation is selected as x-axis or y-axis (e.g., the convenient orientation could be the north direction or could align with a major landscape line), and the horizontal plane is selected as x-y plane. In still other embodiments, one of the anchors 330 could be collocated or integrated with the charging station 308. Furthermore, this anchor 330, which is integrated with the charging station 308, could be selected as the origin of the coordinate system defined by the set of anchors 330.

In some embodiments, the LEDs 806 on the anchors 330 may be used to indicate if an anchor 330 is significantly shadowed or blocked by occlusions or beyond the normal operating range. For example, one or more LEDs 806 on the anchor 330 may emit a specific color or blink in a certain way. Additionally, audio cues may also be used to warn the user about such unfavorable states of one or more anchors 330.

In some embodiments, a pop-up message on the GUI application may also be used to indicate to the user about such disadvantageous or non-optimum location of one or more anchors 330. The user may act upon these warning indicators and install the anchor 330 in a more suitable location in the service area 302.

Figure 17:
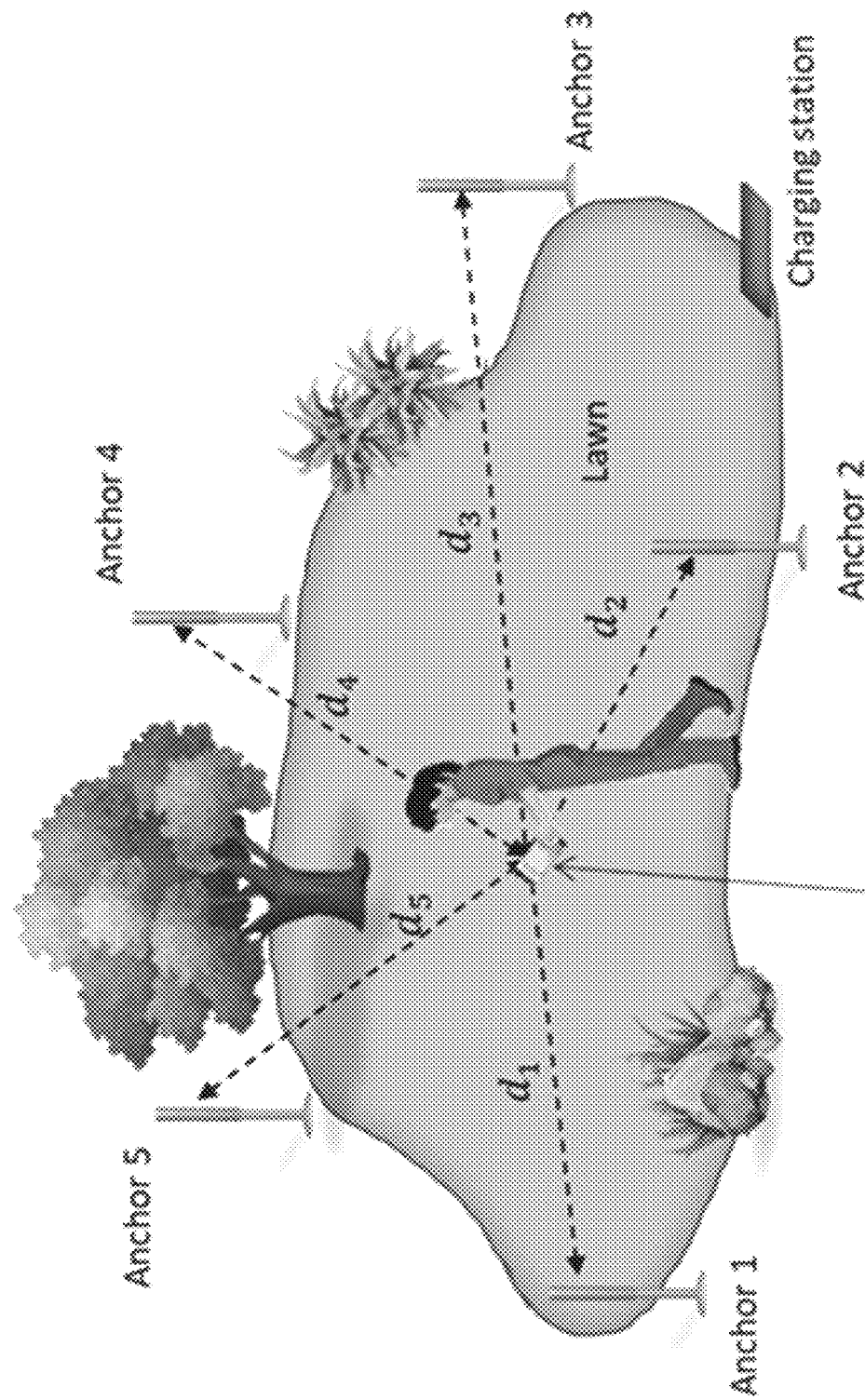
FIG. 17 illustrates a user teaching boundaries by walking along the perimeter of a service area according to embodiments of the present disclosure.

Returning to FIG. 4, after the anchors 330 are installed and their locations determined, the process 400 moves to step 410 to define the various boundaries, landmarks, and obstacles in the map. The system 300 enables the user to utilize an electronic portable handheld device with one or more RF transceivers, a video recording unit, and IMU, and with data processing and storing capability, held by the user above the lawn boundaries while moving along those boundaries to virtually demarcate one or more lawn zones, keep-out (mow-free) zones, and pass-through zones during the initial setup or during map update procedure by continually estimating and recording the portable device's self-location with respect to one or more static RF transceivers fixed in the vicinity of the lawn. This procedure is illustrated in FIG. 17, which shows a user teaching boundaries by walking along the perimeter with a UWB-enabled phone or detachable UWB sensor module.

In some embodiments, the portable handheld device is the electronic device 310, which can be a UWB-enabled smart phone that uses UWB ranging with the set of static UWB anchors 330 installed at multiple locations in the service area 302. The application running on the electronic device 310 uses the UWB range information (i.e., from the electronic device 310 to each of the fixed anchors 330) to self-localize and generates the local map of the various zones from the collection of self-localization data. In FIG. 17, $d_i$ represents the distance between the $i^{th}$ anchor 330 and the tag 340 (disposed on or in the portable handheld device), which is measured using UWB ranging.

In other embodiments (such as when the electronic device 310 does not include a UWB sensor or is otherwise not configured for UWB communication), during the initial setup procedure or during the map update procedure, the user moves around the boundary while holding a UWB sensor (e.g., detached from the robot 320) and the electronic device 310, which is equipped with a compatible application that communicates with the UWB sensor. The boundary is estimated by the UWB sensor via localization and tracking using the anchors 330.

During the regular service mode (i.e., while not doing map-area setup or map-area update) the detachable UWB sensor module may be utilized in various ways. The description below should not be considered as a limitation on the form factor of the UWB sensor.

In some embodiments, the detachable UWB sensor could be attached to the charging station 308 during the regular operation (service mode). In such case, the UWB sensor on the charging station 308 can be used to improve the accuracy of the robot localization or help the robot 320 to return to the charging station 308.

In other embodiments, the detachable UWB sensor could be deployed as an additional anchor 330 to improve accuracy in certain areas that may have more occlusions or obstacles.

In still other embodiments, the detachable UWB sensor could be attached to the robot 320 as the tag 340 or one of the tags 340 during regular service mode. Note that in such embodiments, this detachable UWB sensor can be carried by the user around the boundaries to teach or update the service area maps, such as shown in FIG. 17.

In some embodiments, the portable handheld device, during initial perimeter estimation or during map update, simultaneously captures video or image sequences of the path and time-stamped IMU data while the user moves along the boundary holding the device in her hand. The application in the device associates the self-localization data with the corresponding video or image sequences and the IMU data stream using timestamps. Furthermore, the system 300 can use the IMU data at each time instant to derive the instantaneous pose of the handheld device and derive a transformation for rectifying the associated video frame or image. The rectified video frame or image may be used by the application-either online or offline—to determine the fine shapes of the boundaries of the service area 302 using visual processing of the distinctive features of the boundary at a location and use this shape information to improve the boundary definition obtained from UWB localization.

Additionally, the portable handheld device could also include a GPS module and use the time-stamped GPS data to generate a global map of various zones while the user walks along the lawn boundaries.

The process of the perimeter training can be enumerated as the following set of steps:
1. The user moves along the boundary of the service area 302 holding the UWB-enabled electronic device 310 (or detachable module) in her hand and pointing the camera towards the ground.
2. The anchors 330 are configured as responders for UWB DS-TWR ranging via BLE side-link. This configuration and orchestration can be performed by the controller application running on the electronic device 310, detachable device, or the robot 320.
3. The application configures the UWB module in the electronic device 310 (or detachable module) as the initiator for UWB DS-TWR ranging. This configuration may be done via BLE side-link or UART communication if the detachable UWB module is a separate device from the electronic device 310.
4. The controller application in the electronic device 310 initiates UWB ranging with the anchors 330 and measures the instantaneous distances of itself to each of the anchors 330.
5. At every position, the controller application computes its own location from the set of instantaneous electronic device-to-anchor range measurements in the coordinate frame defined by the anchors 330 (local coordinates).
6. Simultaneously, the electronic device 310 also captures video or image sequences of the ground at the current position and retrieves the IMU data stream.
7. The video frames or image sequences and the IMU data are associated with the corresponding location data via timestamps.
8. The IMU data is used to estimate the instantaneous pose of the electronic device 310 and derive a transformation to undo the distortion of video frame or image sequences due to unintentional tilt, rotation, or translation movements of the electronic device 310 during the data capture.
9. The application analyzes the corrected frames to determine complex shapes of the boundary from the differences in texture, color, material, etc. The shape information could be augmented with the UWB-based position information to improve the accuracy of the boundary points.

Figure 18B:
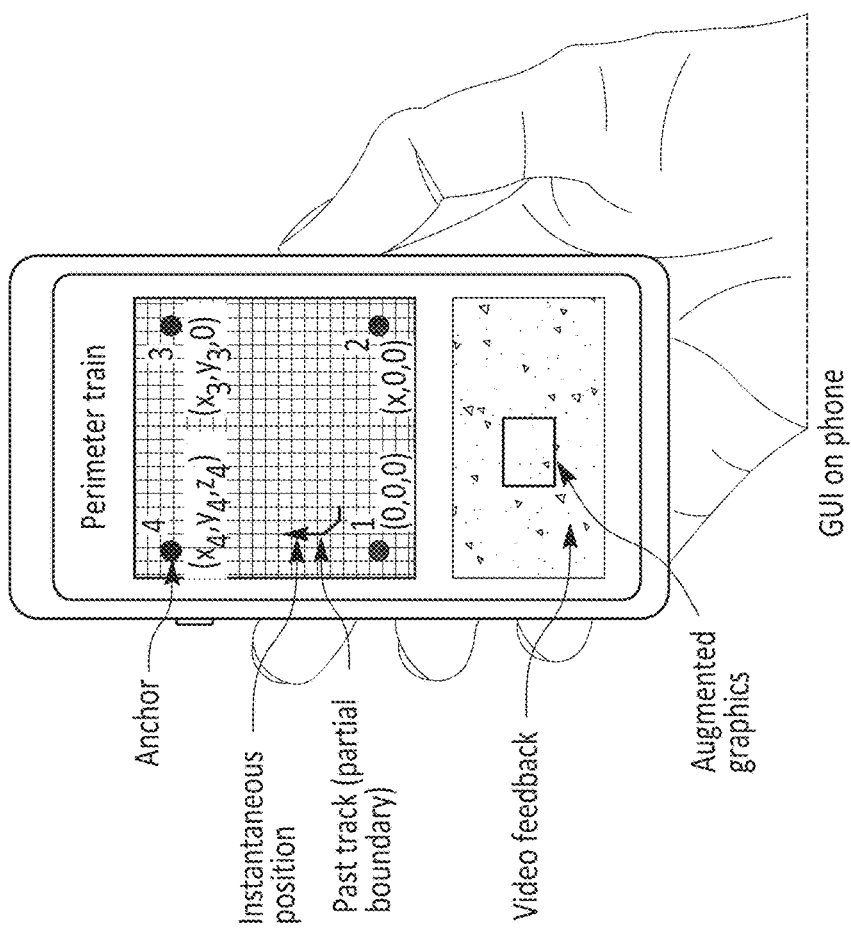
FIGS. 18A and 18B illustrate an example of what the user may observe on the application GUI as she moves along the boundary of the service area, according to embodiments of the present disclosure.
Figure 18A:
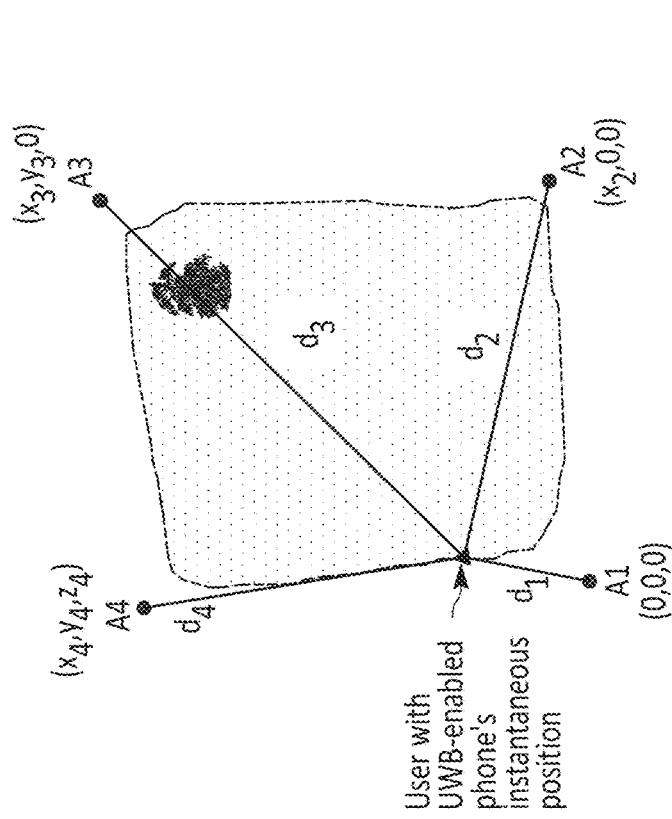

FIGS. 18A and 18B illustrate an example of what the user may observe on the application GUI running on the electronic device 310 (FIG. 18B) as she moves along the boundary of the service area 302 with the UWB-enabled electronic device 310 in her hand (FIG. 18A). The application can show the instantaneous position of the user with respect to the anchors 330 on the grid and the (past) trail of positions. Note that the instantaneous position is mainly obtained from the UWB-based localization. The UWB-based location may be modified (to improve accuracy of the virtual perimeter) using information available from the analysis of visual features in the corresponding video frame. Once the user completes the loop around the boundary of the service area 302, the set of positions defines the complete virtual perimeter of the service area 302. The application also shows the video or image sequences captured by the camera of the electronic device 310 above the boundary. Additionally, the application could also augment other information and graphics on top of the video (shown by the square in the figure) to help the user keep the phone relatively stable and centered on top of the boundary line. Example of augmented text could include but not limited to information such as whether or not the application was able to find distinctive visual features in the current frame.

Figure 19:
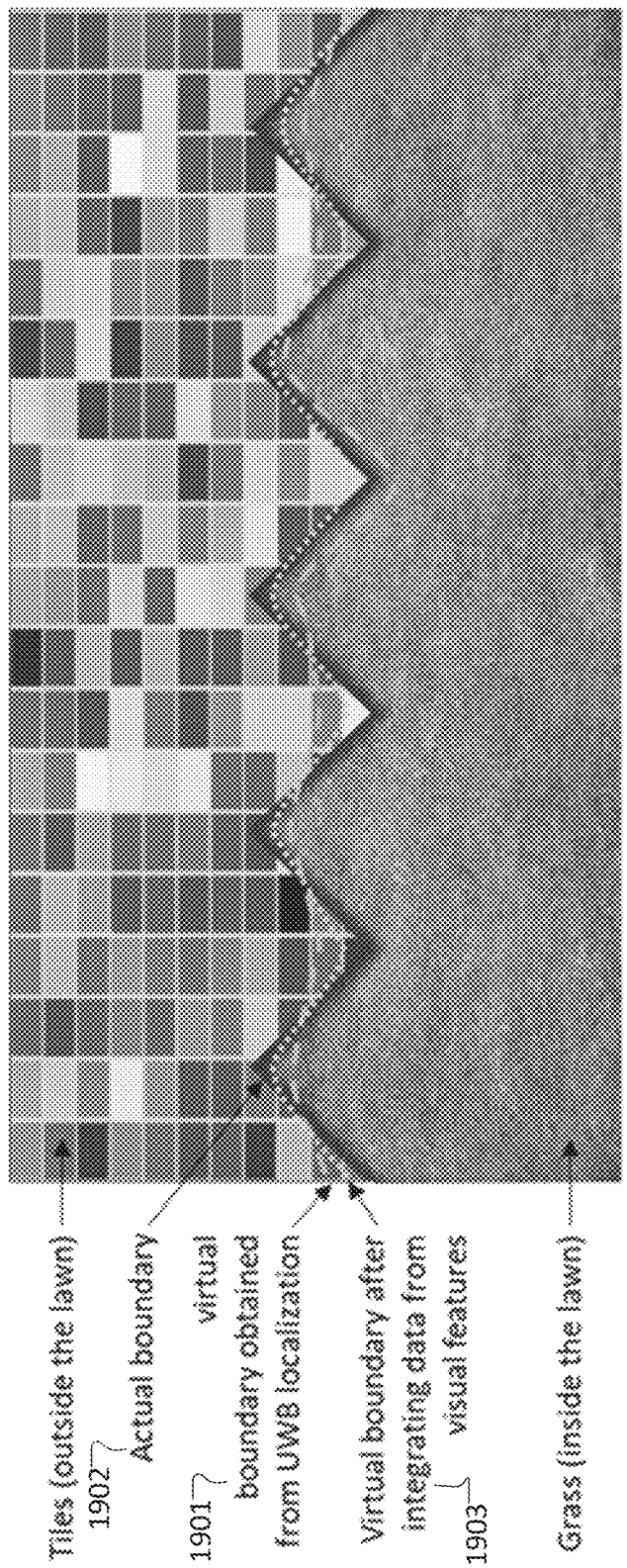
FIG. 19 illustrates an example of improved boundary definition by integrating visual features according to embodiments of the present disclosure.

In some cases, the set of boundary points obtained after UWB localization may be noisy. Moreover, depending upon how the user placed the electronic device 310 over the lawn boundary while training the boundary and the complex shape of the physical boundary, the pure UWB-based virtual boundary may deviate from the actual boundary. The video or image sequences captured with the electronic device 310 or detachable device during the perimeter training can be used to improve the boundary definition (accuracy of the boundary points). FIG. 19 illustrates an example where the physical boundary has a specific repeating pattern. The virtual boundary 1901 obtained via UWB localization, shown by the dashed line, deviates from the actual boundary 1902. The new boundary definition 1903, obtained after integrating the camera and IMU data to improve the boundary definition, is shown by the dotted line.

The processing and integration of the video (or image sequences) data and the IMU data can be performed either online (e.g., in real time, during the perimeter training) or offline. Integrating the visual and IMU data to improve the boundary definition in real time can be computation intensive and consume a significant amount of power. Therefore, it is often advantageous to do this processing offline. Moreover, this processing could also be performed in the robot 320 or remotely on a server by uploading the data to the server for processing and receiving the improved boundary points after processing.

Figures 20A, 20B:
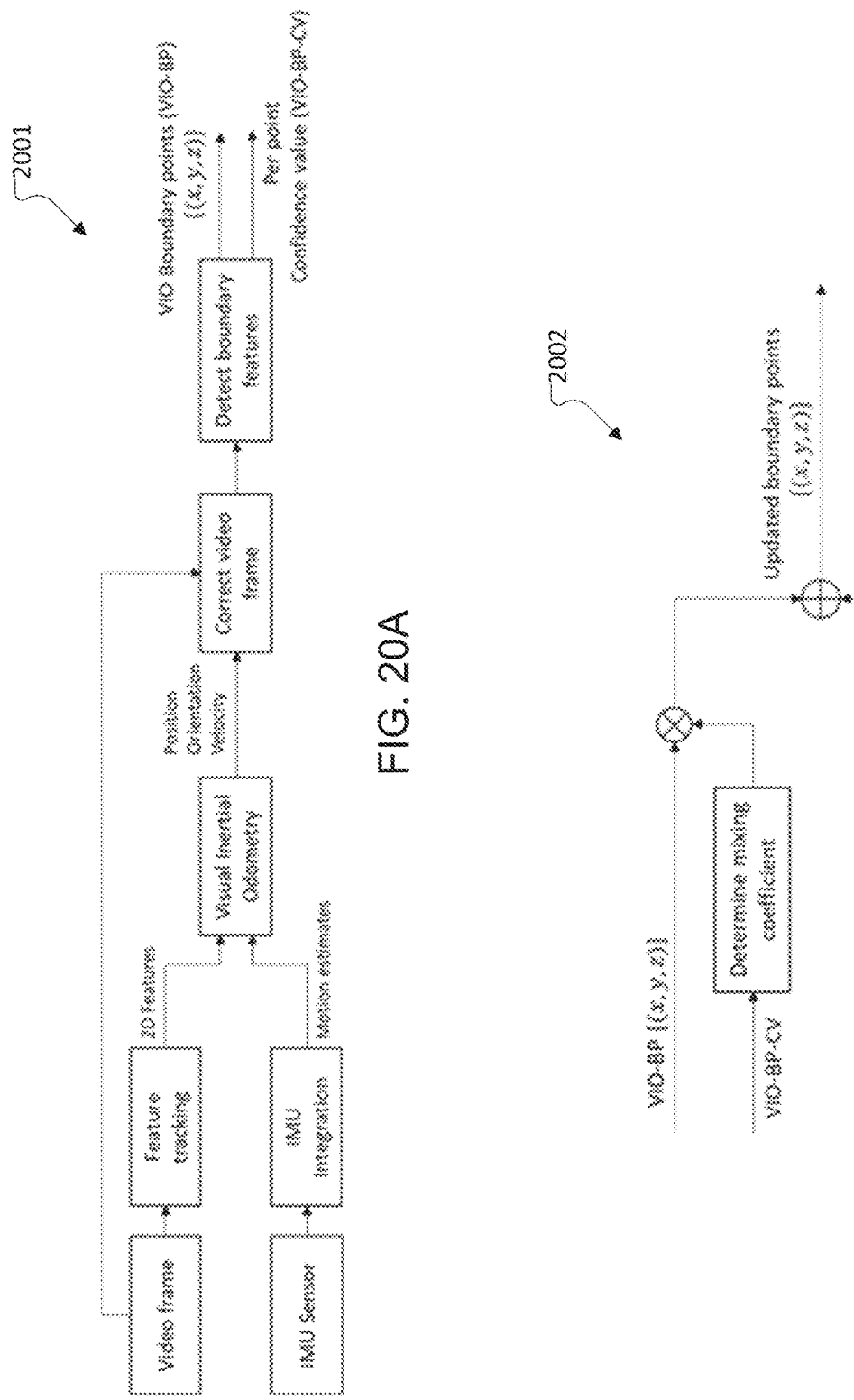
FIGS. 20A and 20B illustrate example processes for improving the UWB-based boundary points by integrating the boundary points detected using visual processing and IMU data according to embodiments of present disclosure.

FIGS. 20A and 20B illustrate example processes for improving the UWB-based boundary points by integrating the boundary points detected using visual processing and IMU data according to embodiments of present disclosure. The process 2001, shown in FIG. 20A generates the boundary points from analyzing visual features that include a set of (x, y, z) tuples denoting the 3D coordinates of the boundary points. Visual Inertial Odometry (VIO) is a technique often used in robotics that integrates video (or image sequences) from one or more cameras with the IMU measurements from one or more IMUs to obtain accurate pose (position and orientation) and velocity of a mobile robot. The process 2001 incorporates elements of one or more VIO algorithms. At the start, the pose of the device that obtains the UWB-based localization (e.g., the electronic device 310) is assigned as the initial camera pose in VIO. The process 2001 also generates a set of confidence values along with the VIO boundary points.

The confidence value associated with each boundary point from the process 2001 is used to generate the weight used for combining the data from visual and IMU analysis. The process 2002 for combining or mixing is shown in FIG. 20B. In some embodiments, a set of confidence values is also generated for each boundary point obtained from UWB-based localization. The confidence values corresponding to the points from the visual and IMU analysis can also indicate whether to reject (i.e., assign zero weight to) a boundary segment (as set of one or more points) from the process 2001. For example, if no distinct visual features corresponding to a boundary could be detected for a segment, the confidence (and the resultant weight) for those points could be set to zero. Generally, a higher confidence is assigned for VIO boundary points when there is high contrast (in brightness, color, material properties, etc.) between the two sides of the boundary.

Similarly, in some embodiments, a low confidence could be assigned to a set of UWB boundary points when non-line-of-sight (NLoS) conditions are determined or if the RSSI of the UWB signal is below a threshold value. The threshold value may be determined from simulations and experiments for a given transmitter power specification for the transmitting antenna, the type of antenna, the height of the transmitter and receiver antennas, or from any other suitable data.

In addition to updating the virtual boundary definition, the video or image sequences obtained during the perimeter training could also be used for determining if one or more anchors 330 have been installed in non-optimum or disadvantageous locations. Therefore, during the offline processing for updating the virtual boundary definitions, images and information related to interesting features near the boundary may be tagged along with location information and stored along with the boundary.

Figure 21:
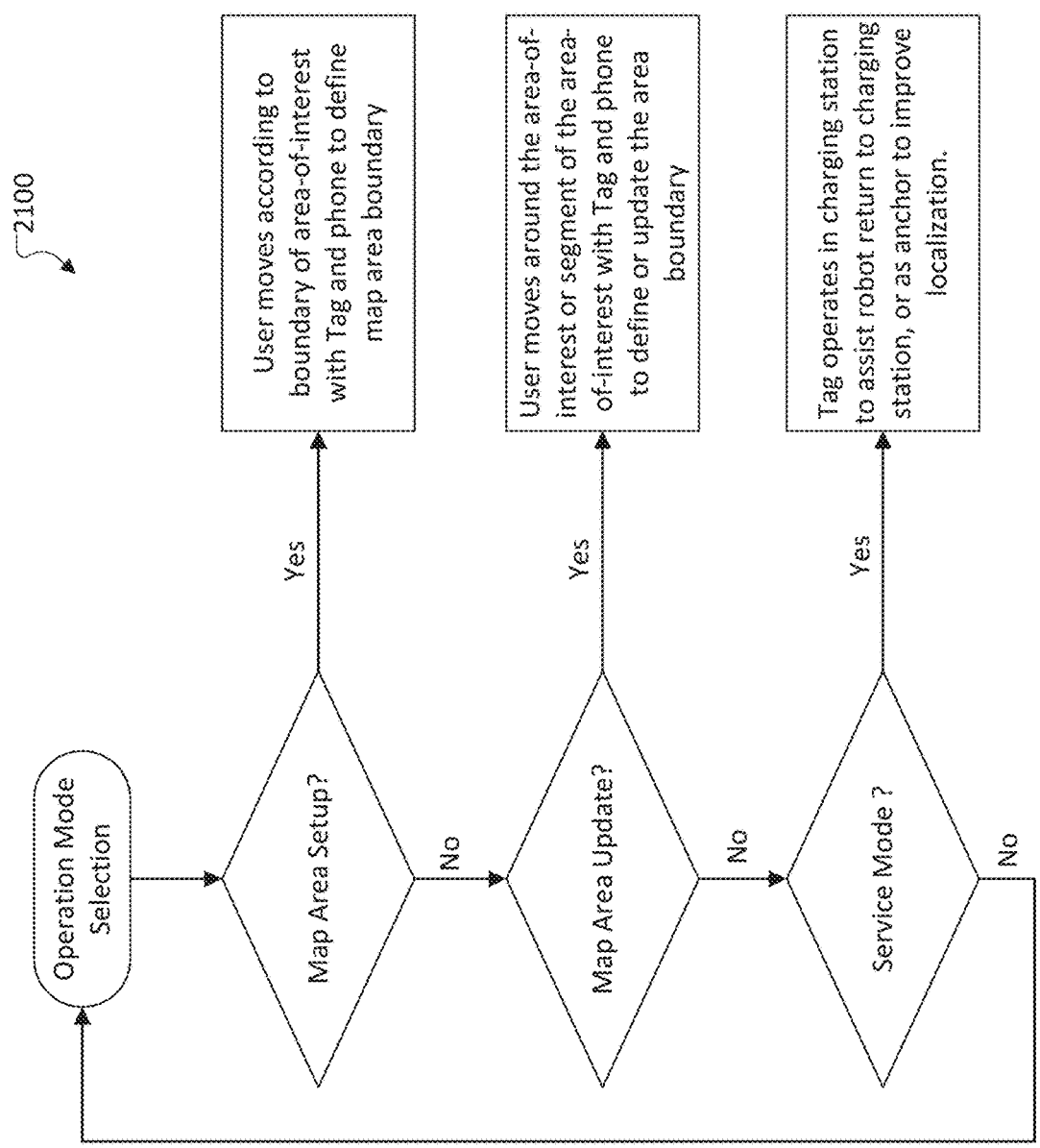
FIG. 21 illustrates an example flowchart of operation modes for a UWB sensor according to embodiments of present disclosure.

Depending upon the task and the nature of the user's interaction with the system 300, the operations performed by the UWB sensor can be generally divided into three basic operating modes. FIG. 21 shows an example flowchart 2100 of the operation modes for the UWB sensor, including a map area setup mode, a map area update mode, and a service mode. Each of these will now be described in greater detail.

Map Area Setup Mode

Figure 22:
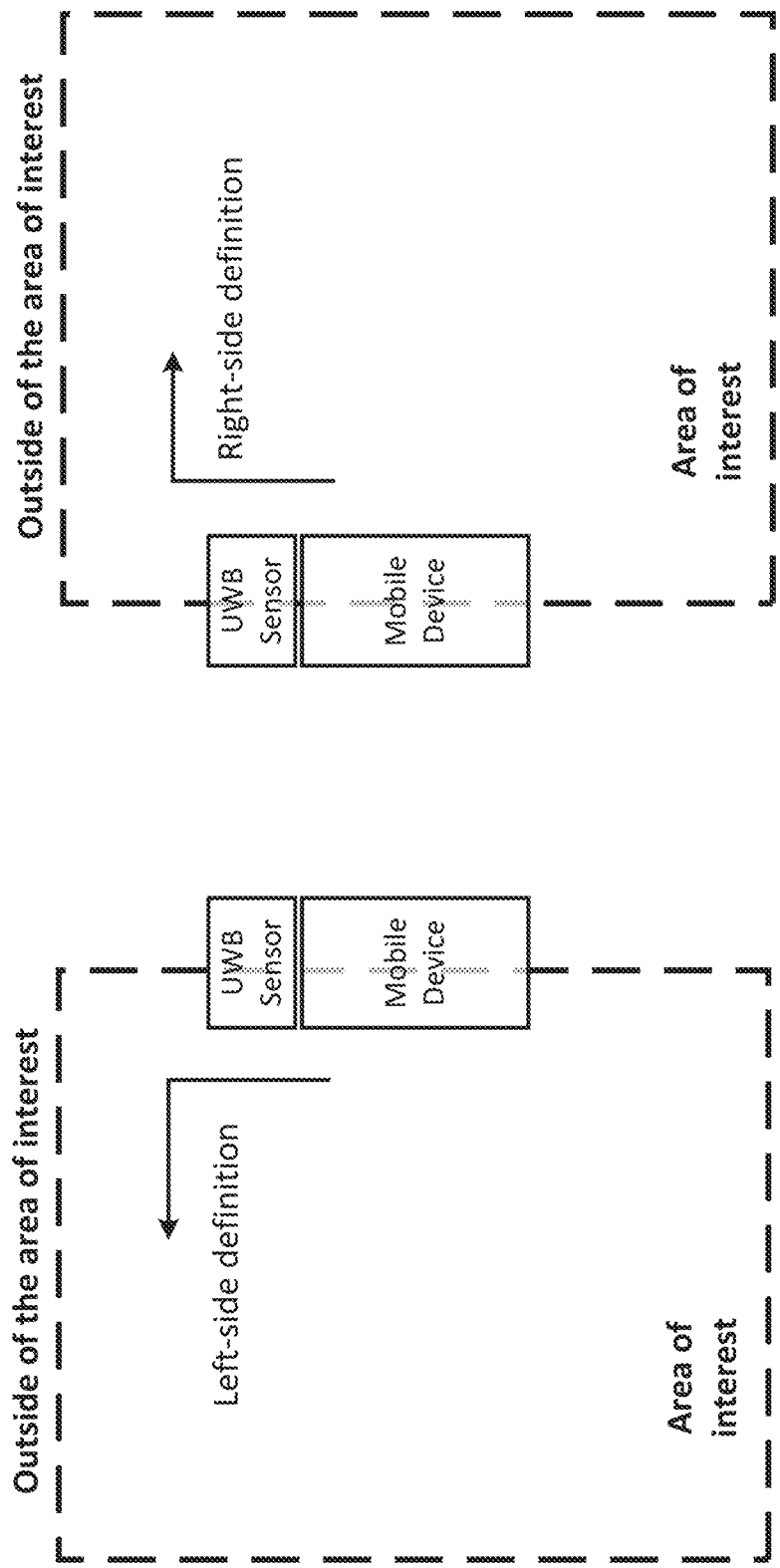
FIG. 22 illustrates different options to define an area-of-interest with the detachable UWB sensor according to embodiments of present disclosure.

During the map area setup procedure, the user selects the type for the area-of-interest to be defined. The type could include (but is not limited to) any the three area types described above: service area 302, keep-out area (obstacle 304), and pass-only area 306. The user also selects the direction for area definition. FIG. 22 shows two different options to define the area-of-interest with the detachable UWB sensor. One option is the left-hand definition, where the area-of-interest is always on the left side of the UWB sensor trajectory. This results in counter-clockwise movement around the enclosed area. The other option is the right-hand definition, where the area-of-interest is always on the right side of the UWB sensor trajectory. The right-hand definition mode results in clockwise movement around the enclosure area. In some embodiments, the user can move around the perimeter of the area-of-interest to define the area.

In other embodiments, the user can leverage other boundaries that are already defined. For example, if the pass-only area 306 in FIG. 3 is defined after the map boundary and house boundary are already defined, then user only needs to define two-line segments of the pass-only area 306 and use the intersecting line segments from the map and obstacle boundaries to define the enclosed pass-only area 306.

During the map area setup mode or the map area update mode, the IMU data and camera images (preferably with camera pointing to the ground) can be recorded for additional functionality. The camera images captured at the boundaries can be associated with the locations. If the color or texture of the two sides of a boundary are distinctive, the information could be extracted to use in vision-sensor-based boundary detection to further improve the accuracy when the robot 320 navigates at the boundaries. In addition, the IMU data can be used to align the UWB coordinates with geographic coordinates, as explained below.

Figure 23:
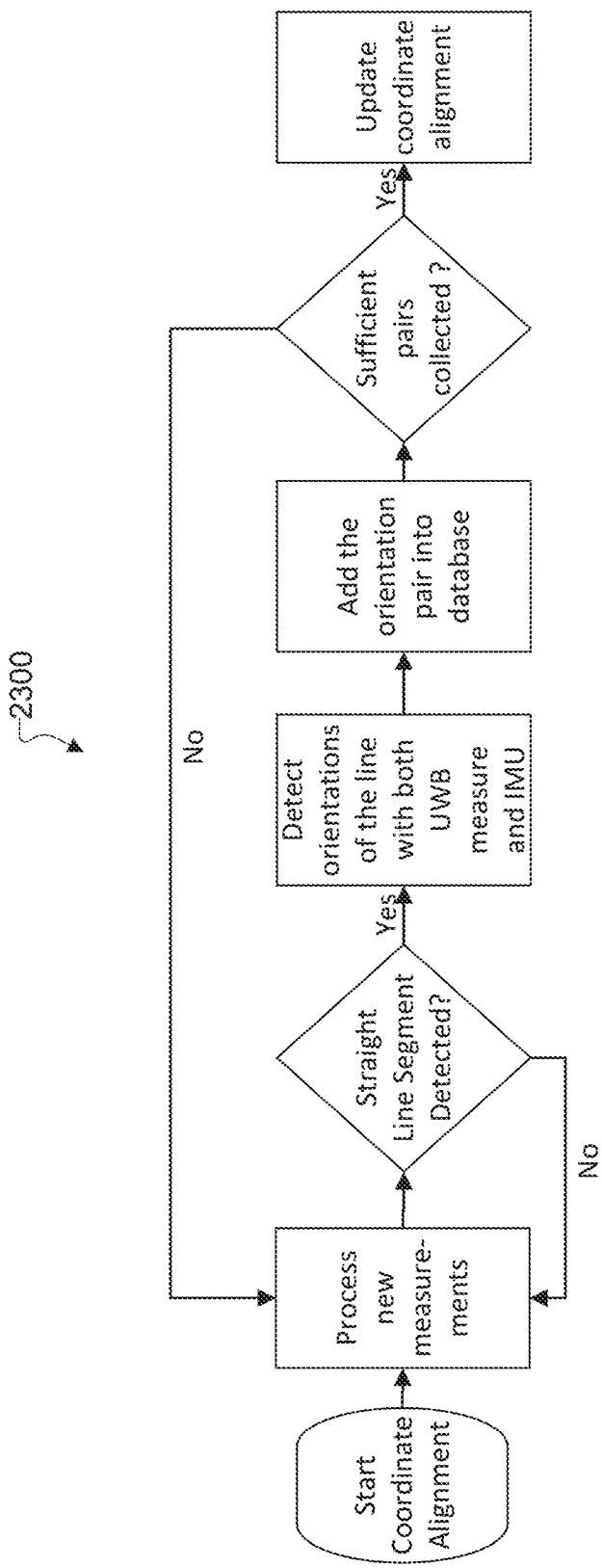
FIG. 23 illustrates an example alignment process based on UWB and IMU measurements according to embodiments of present disclosure.
Figure 24:
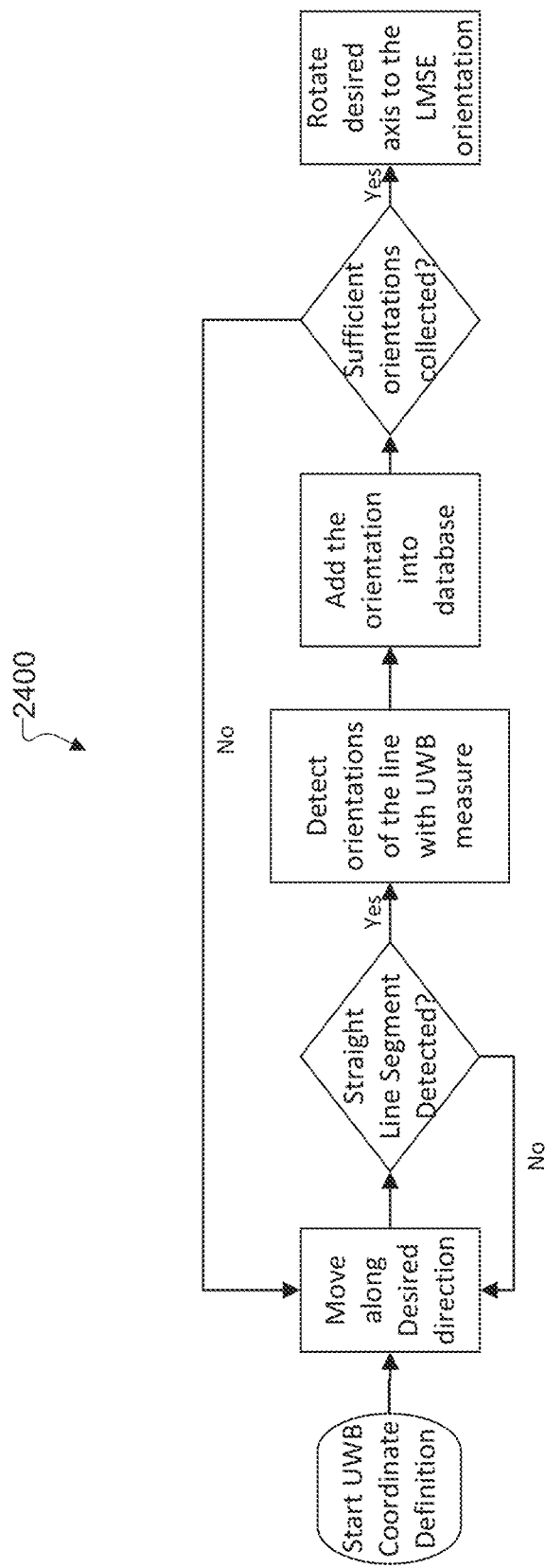
FIG. 24 illustrates an example alignment process based on UWB measurement according to embodiments of present disclosure.

One important function for the map area setup mode is to define a good coordinate system. In some embodiments, the default coordination defined based on anchor locations can be used. But sometimes if the anchor placement is not aligned well with how a human perceives the area, it could cause confusion. Two alternatives are:

1. Align the north direction to one of the axes and the horizontal plane as the x-y plane. This is consistent with how a human views the map and is also convenient for overlaying with one or more satellite images to the area map, if desired. An example alignment process 2300 based on UWB and IMU measurements is illustrated in FIG. 23.
2. Align one of the axes to a natural line formed by a landmark, e.g., a property boundary, road, or building wall. An example alignment process 2400 based on UWB measurement is illustrated in FIG. 24.

Another embodiment of the map area setup mode is to directly move the robot 320 around the map area boundary and use the on-board UWB sensors to define the boundaries. The overall mode selection is similar to that shown in FIG. 21, except that in the map area setup procedure, the charging station 308 is mapped specifically. Additional sensor assistance (vision, etc.) may be needed for the robot 320 to return to the charging station 308. Another adjustment is that the maneuver margin of the robot 320 should be taken into account for the boundary obtained by the robot 320.

Map Area Update Mode

The map area update mode can be used after the initial setup, when updates to the map areas are desired or required to adjust to the changed environment. In the map area update mode, the user can add, modify, or remove areas of interest. While a remove operation does not require any new UWB measurements, the process of adding or modifying areas of interest may require one or more UWB measurements similar to the map area setup procedure described above.

To update an area of interest, the user can be allowed to update only a segment of the perimeter. The update can be performed by detecting the line segment intersection with the existing area boundary. The procedure can allow some basic area modification operations, such as union, subtract, combine, and the like. The map area update mode can also allow the user to manually adjust a measured boundary through the application GUI.

Service Mode

The service mode is applicable to the case where the detachable UWB sensor is a stand-alone sensor. The options to utilize this additional UWB sensor include (i) install in the charging station 308, (ii) install as an additional anchor 330, or (iii) install on the robot 320.

After the setup is completed, if the detachable UWB sensor will be used as an anchor 330 and the service area 302 is large (thus requiring more than one zone), then one or more anchors 330 designated for a different area can be reused to define a specific area. Thus, no additional UWB sensor is required. When the whole service area 302 can be covered with four anchors 330, the additional UWB sensor can be deployed in a certain area to improve the coverage and accuracy.

If the detachable UWB sensor will be used in the charging station 308, this can help the robot 320 return to the charging station 308 (especially with low light or no light condition). In some embodiments, the location of the charging station 308 and the robot 320 can be tracked in real-time using UWB localization. This allows the robot 320 to be guided back to the charging station 308. In some embodiments, when the robot 320 is in the vicinity of the charging station 308, the UWB sensors in the robot 320 and charging station 308 can switch to device-to-device mode.

For optimal operation of the system 300, the anchors 330 should be installed in good locations, so that the UWB signals transmitted from the anchors 330 can reach any point within the service area 302 with good signal strength (e.g., above a predetermined threshold), while propagating through none to minimal obstructions in between. That is, it is preferable to have as much direct, line-of-sight operating conditions as possible. Depending on the type and size of the service area 302, and the type, number, and locations of occlusions in the service area 302, the user may not always install the anchors 330 at the optimum locations. On the other hand, the user may unknowingly install one or more anchors 330 at locations that are detrimental to the system performance. Therefore, it is useful if the user can be warned about adverse anchor placements.

In some embodiments, the system 300 can analyze the data collected during the initial setup and service area perimeter estimation and identify if the system configuration (with regards to the number of anchors 330 and the anchor placements) is unfavorable, and if the configuration can be improved by relocating one or more anchors 330 within the service area 302 or by installing new anchors 330 at one or more new locations. Since the heights of the anchors 330 (height of the UWB modules in the beacon poles from the ground), heights of the one or more UWB tags 340 installed in the robot 320, the type of the UWB antenna (for e.g., monopole, dipole, patch, etc.) and gains, the enclosure material and shape, transmission power and frequency, etc. are known from system design and specification, the antenna radiation patterns, RSSI characteristics, RF link budget, and maximum range on different surfaces can be characterized using simulations and verified through field experiments. Based on this analysis, the optimum configurations for the system 300 can be defined.

Figure 25:
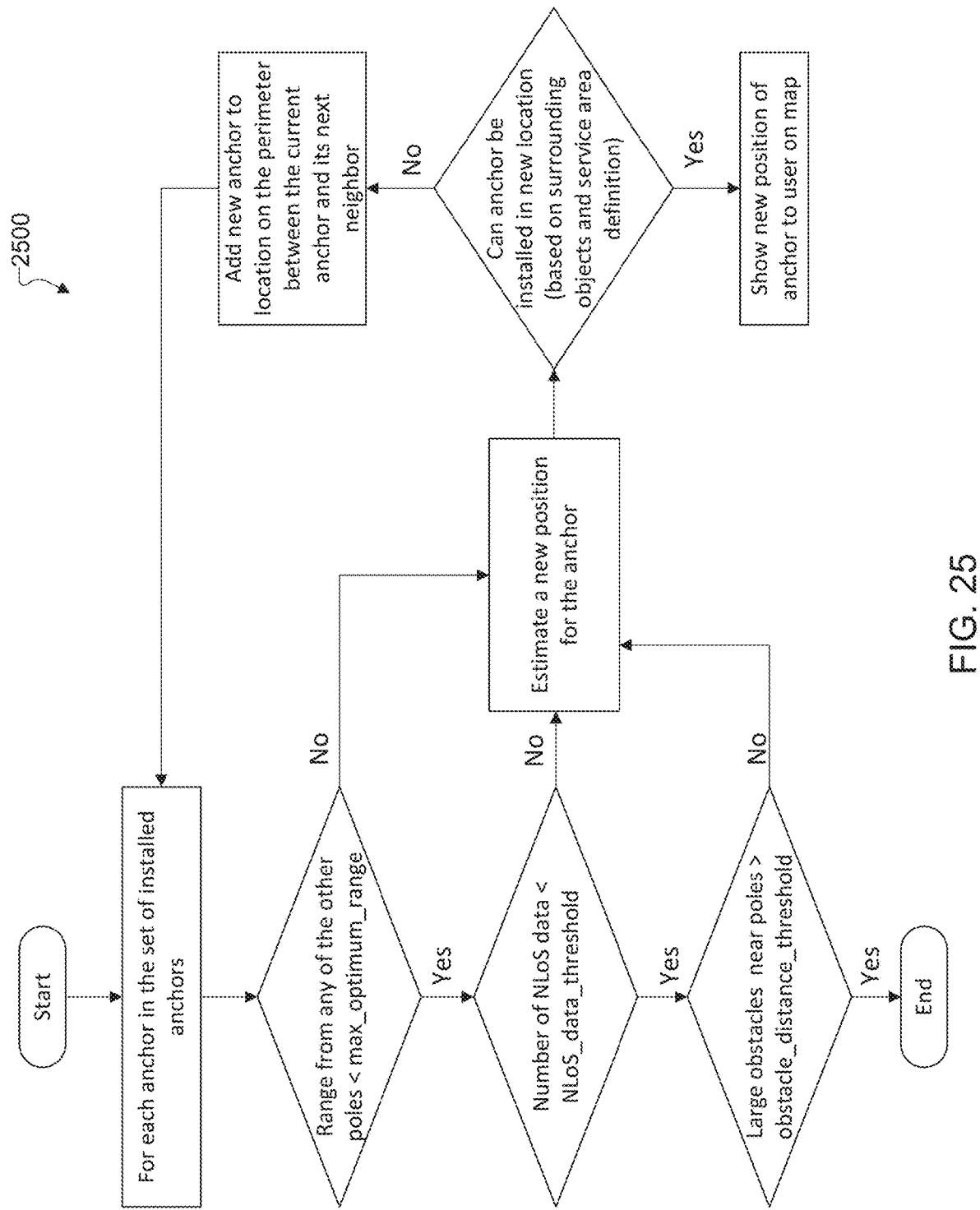
FIG. 25 illustrates an example rule-based method for anchor location optimization according to embodiments of the present disclosure.

Data collected during the perimeter estimation and initial setup (anchor location estimation) can provide sufficient information to the system 300 to find out if the anchor locations and the number of anchors 330 covering the service area 302 results in non-optimal system configurations. Examples of data collected for such analysis can include RSSI at various locations around the perimeter, quantity of LoS vs. NLOS classification of data at locations along the perimeter, CSI, occlusions (e.g., walls and trees) near the perimeter or anchor poles identified from the image sequences or videos collected during perimeter training, and the type of surface. The type of surface can be identified by analyzing the images. Additionally, the user could also provide information or identify the surface in the service area 302 using the application. In some embodiments, a heat map of the RF coverage (such as RSSI characteristics) can be obtained during the mowing operations. Once the system 300 identifies non optimal system configuration-whether non-optimal anchor placements or fewer than needed anchors 330—the application can warn the user via pop-up notifications on the GUI application. FIG. 25 illustrates an example rule-based (heuristic) method 2500 for anchor location optimization according to embodiments of the present disclosure. The heuristics can be based on empirical data analysis and simulations of the effects of common occlusions, surfaces, RF transceiver antenna type and heights on the RSSI and maximum range of the RF ranging modality, etc. Other parameters such as surface can easily be appended to the rule chain.

Figure 26:
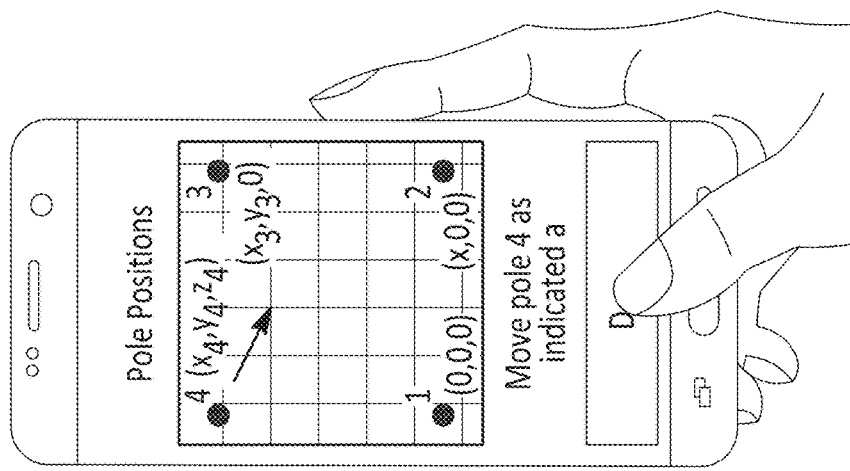
FIG. 26 illustrates an application GUI providing options to a user for improving anchor positions according to embodiments of present disclosure.
Figure 26:
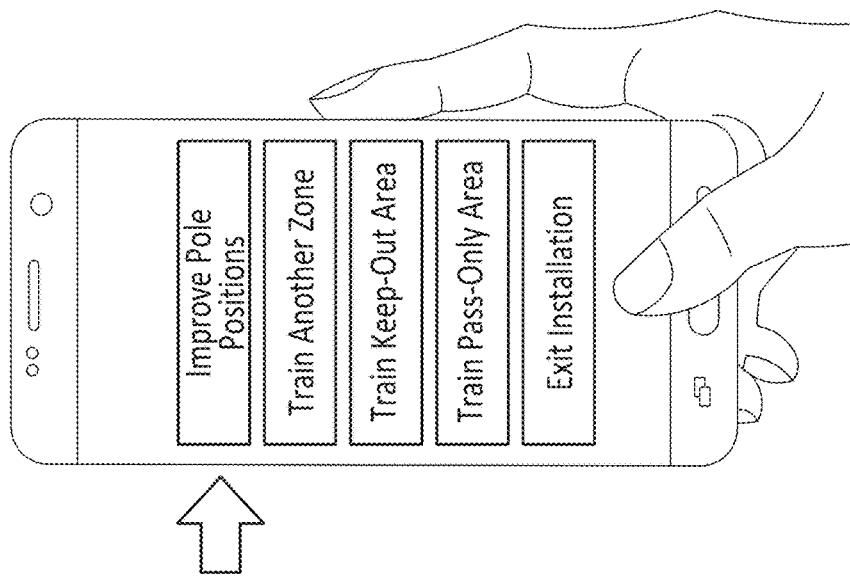
Figure 26:
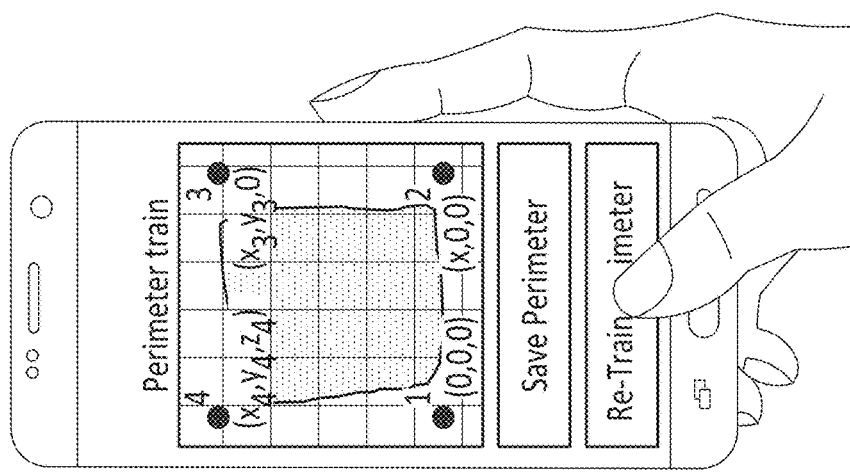

In other embodiments, the application may allow the user the initiate the analysis of system configuration following perimeter estimation via the GUI as shown in FIG. 26. The user can click on a GUI button to start system configuration analysis. If the user selects to optimize anchor positions, the application analyzes the anchor positions based on UWB coverage and recommends the best locations to the user. If the user relocates an anchor 330, its position is estimated again.

As discussed earlier, the UWB anchor coordinates provides the reference for the local map. In other words, following the initial setup and perimeter estimation, using UWB-based ranging provides the location of the anchors 330 and the map of the service area 302 in the coordinate frame defined by the set of anchors 330 as shown in FIG. 14. This is the local map. Although the local map is completely adequate for the robot 320 to navigate in the service area 302, showing the anchors 330, perimeter, and the different zones in the service area 302 to the user overlaying a geographic map (or global coordinates) makes it easy for the user to view, interpret, and modify (if required) the different zones. Examples of geographic coordinates can be seen in GOOGLE maps, APPLE maps, and the like. These services can be made available on the electronic device 310 used by the user for interacting with the service area map and features. In order to overlay the local coordinates on the geographic map, it may be necessary or helpful to first align (involving scaling, translation, and rotation) the local coordinate system with the geographic coordinate system.

In some embodiments, in which both the electronic device 310 (or the detachable module) and the robot 320 have GPS and UWB modules, the following procedure can be employed for the alignment:

1. Determine the location of the electronic device 310 in the local coordinate system (using UWB ranging with the anchors 330).
2. Determine the location of the robot 320 that is placed in the service area 302 but further away from the electronic device 310 in the local coordinate system (using UWB ranging with the anchors 330).
3. Determine the global coordinates of the electronic device 310 and the robot 320 using GPS.
4. Now there are two 3D locations (of the electronic device 310 and the robot 320) in the two coordinate systems, which can be used to determine the scale and rotation between the two coordinate systems.
5. Apply the determined scale and rotation to the local coordinates before overlaying the zones and the anchor locations on top of the global map.
6. Optionally use visual features and IMU data obtained during the perimeter estimation and satellite images obtained via the global map's API to fine tune and correct for any inaccuracies in the GPS data.

In some alternative embodiments, in which only the electronic device 310 (or detachable module) is GPS-enabled, but not the robot 320 (assuming both are UWB-enabled), the following procedure can be employed for the alignment:

1. Determine the location of the electronic device 310 in the local coordinate system (using UWB ranging with the anchors 330).
2. Determine the location of the robot 320 that is placed in the service area 302 but further away from electronic device 310 in the local coordinate system (using UWB ranging with the anchors 330).
3. Determine the global coordinates of the electronic device 310 using GPS.
4. Now there is one 3D location (of the electronic device 310) in the two coordinate systems. Therefore, the location of the electronic device 310 acts as a "pivot" to rotate the local coordinates with respect to the global coordinates. However, the scale and rotation between the two coordinate frames need to be determined.
5. Use visual features and IMU data obtained during perimeter estimation and satellite images obtained via the global map's API to roughly align the two coordinates.
6. Optionally prompt the user to do the fine-tune alignment between the two coordinate frames using the application UI.

Figure 27A:
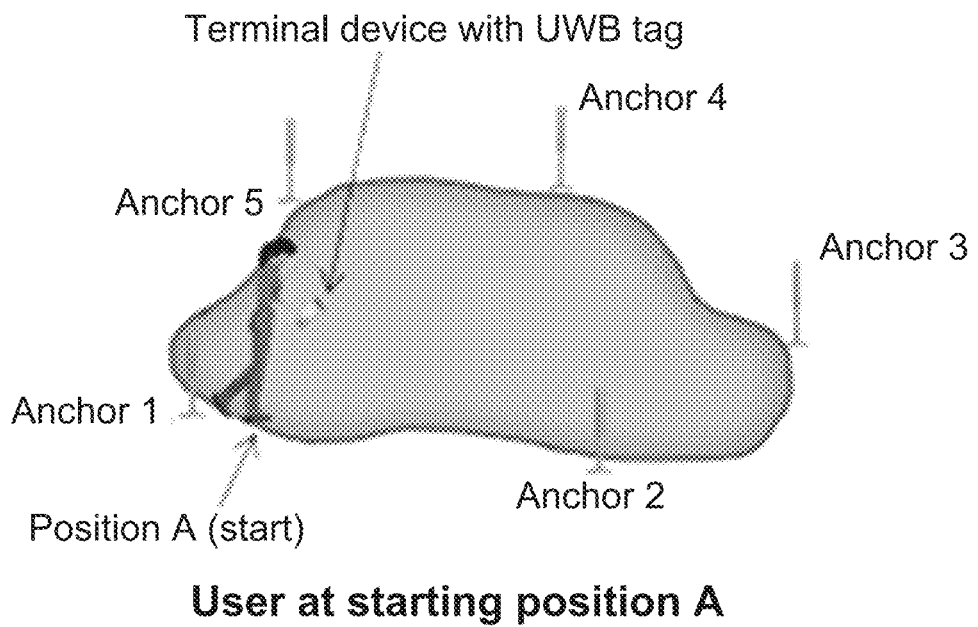
FIGS. 27A through 27E illustrate an example of how a service area map is created as the user moves along the lawn boundary with a terminal device having an attached UWB tag according to embodiments of the present disclosure.
Figure 27B:
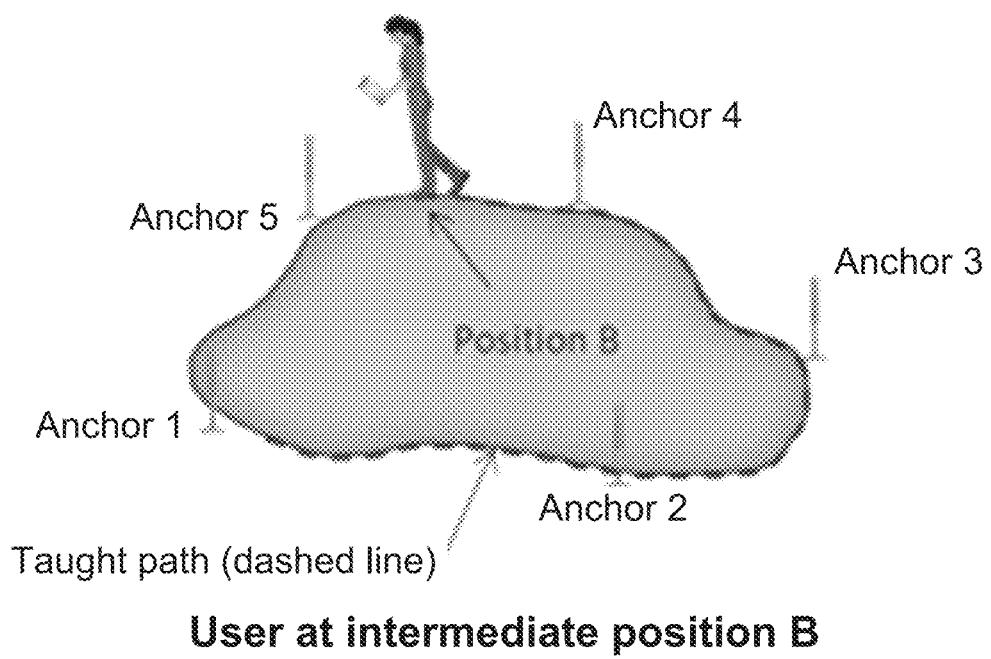
Figure 27C:
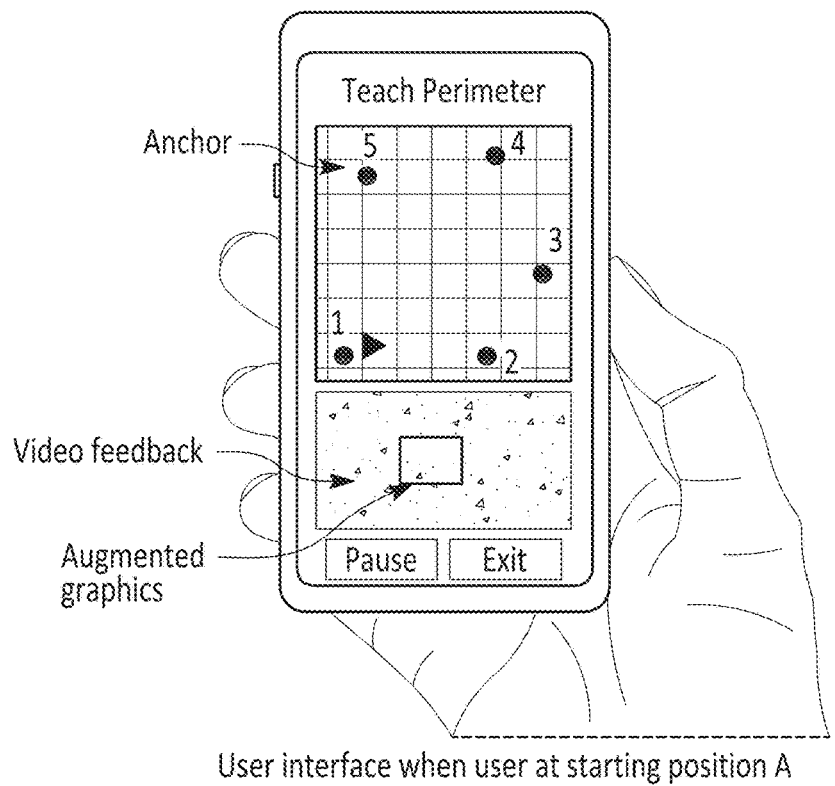
Figure 27D:
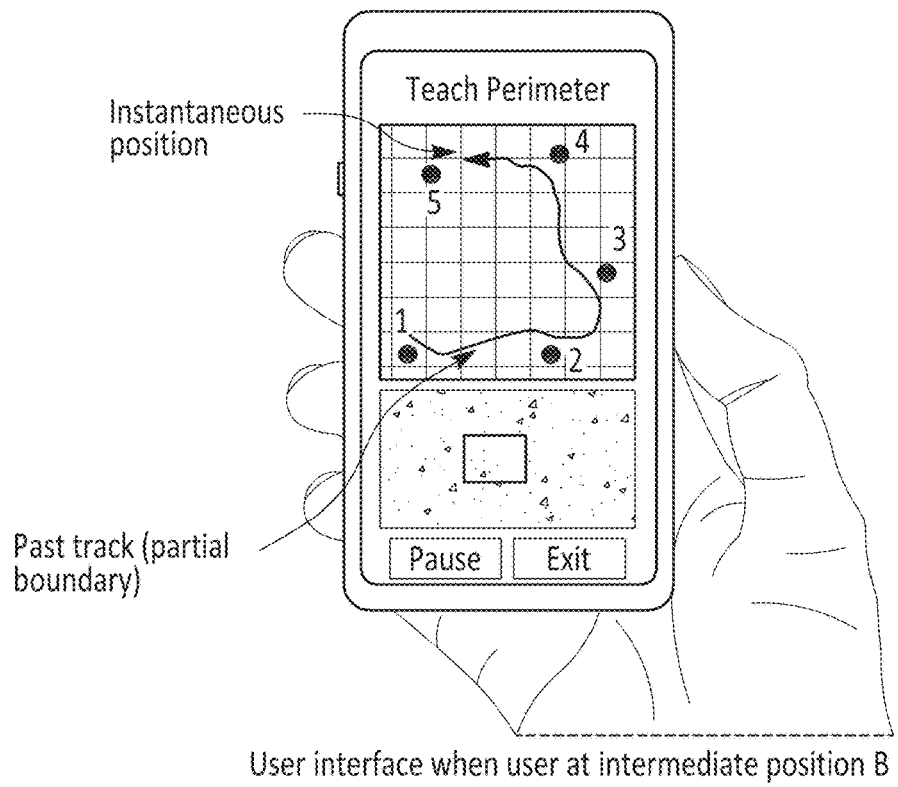
Figure 27E:
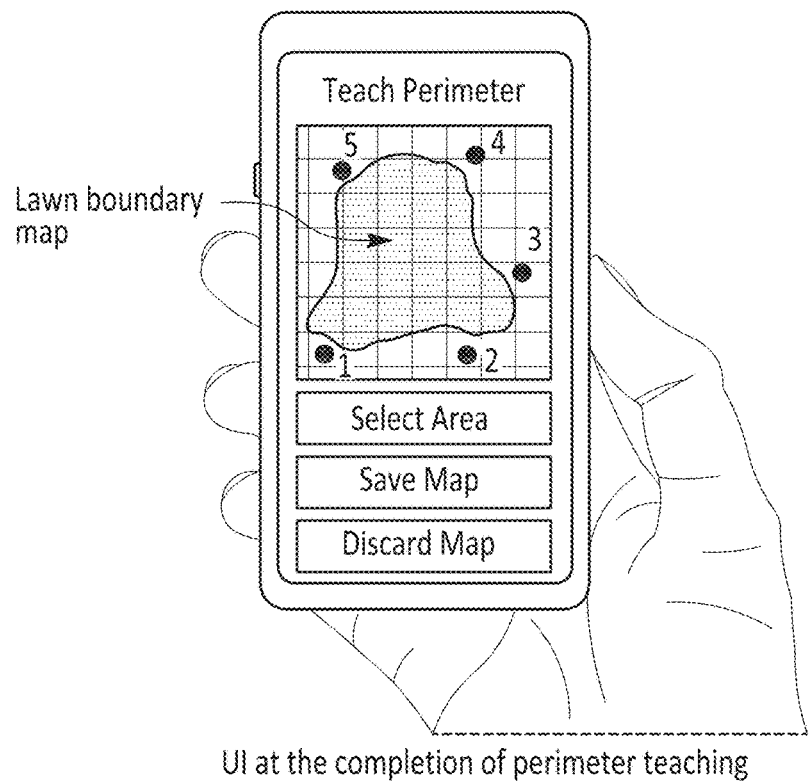

FIGS. 27A through 27E illustrate an example of how a service area map is created as the user moves along the lawn boundary with a terminal device (e.g., the electronic device 310) having an attached UWB tag according to embodiments of the present disclosure. In particular, FIGS. 27A and 27B show the user moving around the boundary of the service area, while FIGS. 27C through 27E show an example GUI on the terminal device during the user's movement. The GUI shows the locations of the anchors on a grid-map, the current location of the user on the grid-map, and the video feed from the camera. The augmented graphics overlaid on the video feed can guide the user to hold and orient the terminal device appropriately. When the user is at an intermediate position along the loop (FIG. 27B), the GUI shows the current position of the user with respect to the anchors, and the traced patch from the starting points (FIG. 27D). After the user goes around the lawn (or any other region for virtual demarcation) and reaches the starting point, the encircled region is shown on the GUI (FIG. 27E). The user can then select the region for assigning a type to the region (service area, keep-out area, etc.) or modify the map. Additionally, the user may save or discard the map.

Figure 28A:
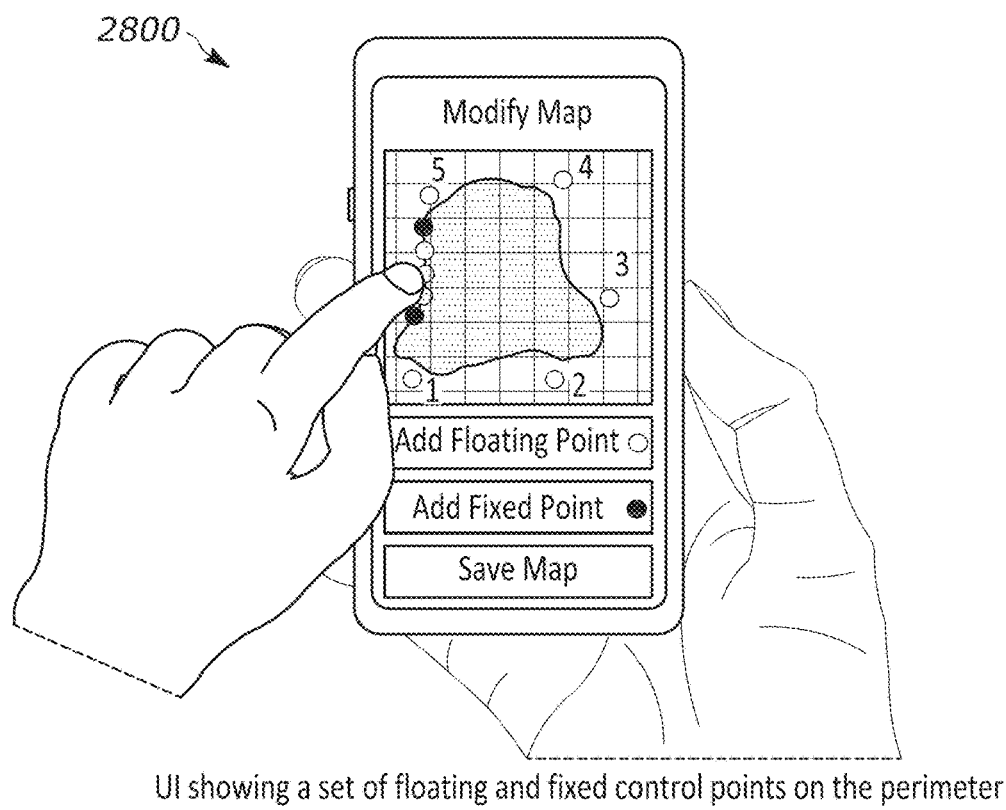
FIGS. 28A and 28B illustrate an example GUI that could be used by the user to modify the map generated from perimeter training according to embodiments of present disclosure.
Figure 28B:
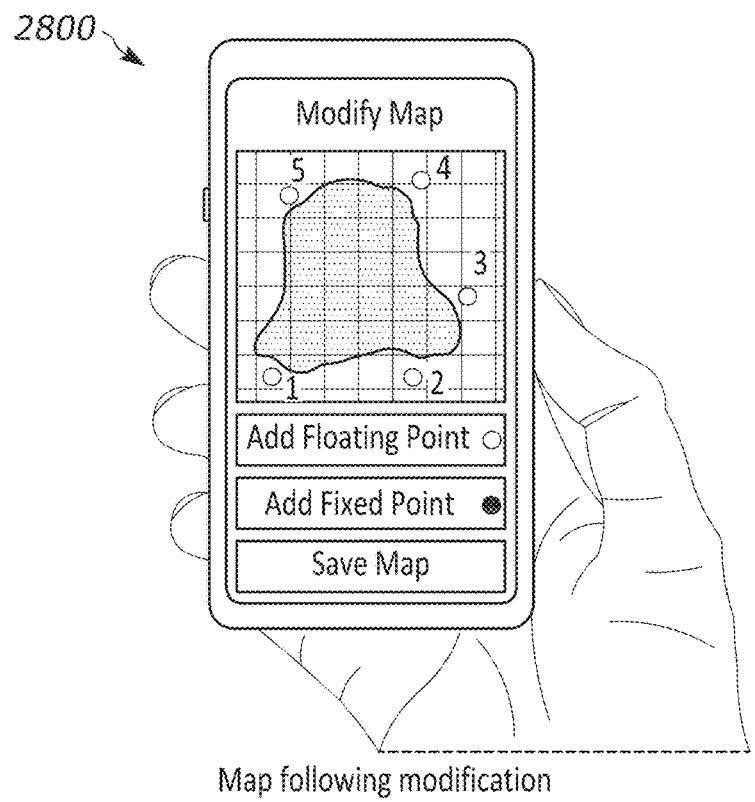

In some embodiments, the user can select the map obtained from perimeter training for modifying its shape. FIGS. 28A and 28B illustrate an example GUI 2800 that could be used by the user to modify the map generated from perimeter training. As shown in FIG. 28A, the user can add a set of floating points on a local region along the perimeter. The one or more floating control points are surrounded by two fixed control points on either end. While the floating points are allowed to move (modifying the perimeter) the fixed points do not (i.e., are anchored to the location). The user may drag one or more floating points to modify the perimeter. While the user drags one of the floating points, the neighboring floating points also move by an amount that is inversely proportional to the distance of the floating point from the floating point being directly dragged by the user. The density of floating points (added by the user) influences the curvature of the modified perimeter section, which is shown in FIG. 28B. Furthermore, a greater number of floating control points allow finer (or more precise) shape modification of the perimeter section.

Figure 29A:
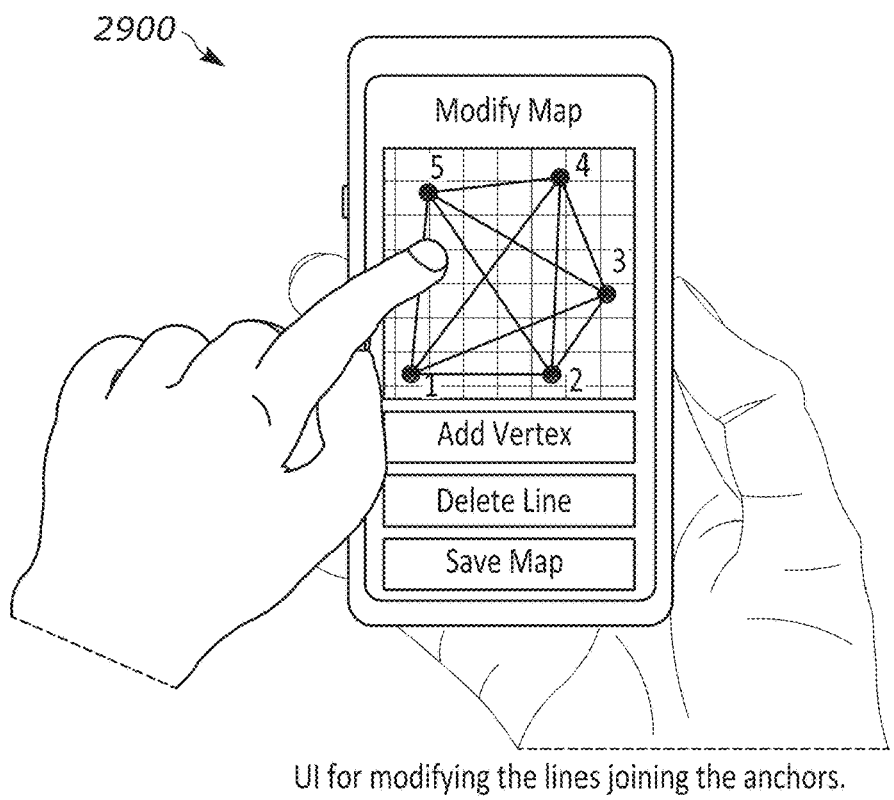
FIGS. 29A and 29B illustrate an example GUI for interactive generation and modification of maps of polygonal service areas according to embodiments of present disclosure.
Figure 29B:
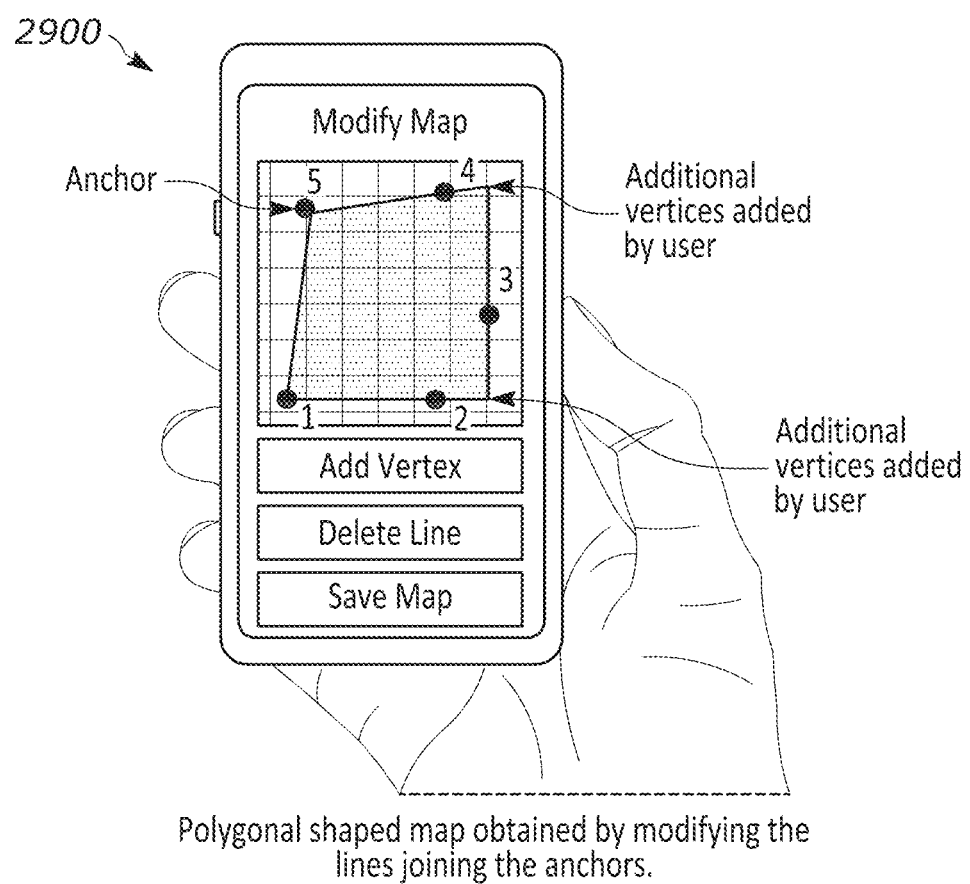

In the above embodiments, the user is able to modify a map obtained from the perimeter training process. Alternatively, in other embodiments, the user may not do a complete perimeter training for one or more sections of the service area. For example, if the service area or a section of the service area is of a simple polygonal shape (for example, a simple quadrilateral shaped lawn) then, the user can generate and modify the map of the section on the GUI 2900 starting from the set of lines joining the anchors, such as shown in FIGS. 29A and 29B. The user can select one or more lines (e.g., the line 2-5 in FIG. 29A) from the set of lines joining the anchors to modify and generate a polygonal region for servicing. The user may also add one or more points (vertices) to the selected line and modify the shape of the polygon (e.g., add and move vertices, etc.), as shown in FIG. 29B.

Although FIGS. 5 through 29B illustrate an example of a system 300 for setting up a RF based robot localization and related details, various changes may be made to FIGS. 5 through 29B. For example, while the robot 320 is generally described as a UWB based autonomous robot, the procedure described in this disclosure can be applied to other RF sensors, alone or together with UWB sensors. In one example, the disclosed techniques can be applied to a GPS sensor with the anchor setup step replaced with a reference BS setup. In another example, the disclosed techniques can be applied to a Wi-Fi sensor with one or more anchors 330 replaced with a Wi-Fi access point. Also, various components in FIGS. 5 through 29B could be combined, further subdivided, or omitted and additional components could be added according to particular needs. In addition, various operations in FIGS. 5 through 29B could overlap, occur in parallel, occur in a different order, or occur any number of times.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
when a handheld device is in motion within a service area to be traversed by a robot:
obtaining ultra-wideband (UWB) ranging measurements between the handheld device and multiple anchors located in the service area; and
obtaining image data and inertial measurement unit (IMU) data;
determining a trajectory of motion of the handheld device based on the UWB ranging measurements;
adjusting the trajectory based on image features obtained from the image data and motion estimates obtained from the IMU data by combining the image data and the motion estimates using weights determined by a set of confidence values; and
identifying the adjusted trajectory as a boundary of the service area.

2. The method of claim 1, further comprising:
determining whether the following conditions are satisfied for a given anchor of the multiple anchors:
a range of the given anchor from each of the other anchors is less than a first threshold;
a number of non-line-of-sight UWB ranging measurements is less than a second threshold; and
an obstacle proximate to any other anchor of the multiple anchors is greater than a third threshold;
in response to any of the conditions not being satisfied, estimating an adjusted position for the given anchor based on UWB signal coverage and the image data; and
displaying the adjusted position on a user interface as a suggested new position for the given anchor.

3. The method of claim 1, further comprising:
determining local coordinates of the anchors based on additional UWB ranging measurements between pairs of the anchors; and
aligning the local coordinates of the anchors with a geographic coordinate system based on at least one of: the image data, the IMU data, satellite image data, and GPS data.

4. The method of claim 3, further comprising estimating coordinates of at least one of the handheld device and the robot in at least a local coordinate system via UWB ranging.

5. The method of claim 3, wherein the anchors are logically arranged as a sequence of anchors, and the local coordinates of the anchors are determined based on a coordinate system defined by at least three anchors of the sequence of anchors.

6. The method of claim 1, further comprising transmitting the boundary of the service area to the robot.

7. The method of claim 1, wherein each image data point and each IMU data point are associated with a respective timestamp and a respective point along the trajectory.

8. A device comprising:
an image sensor;
an inertial measurement unit (IMU); and
a processor operably connected to the image sensor and the IMU, the processor configured to:
when the device is in motion within a service area to be traversed by a robot:
obtain ultra-wideband (UWB) ranging measurements between the device and multiple anchors located in the service area;
obtain image data from the image sensor; and
obtain IMU data from the IMU;
determine a trajectory of motion of the device based on the UWB ranging measurements;
adjust the trajectory based on image features obtained from the image data and motion estimates obtained from the IMU data by combining the image data and the motion estimates using weights determined by a set of confidence values; and
identify the adjusted trajectory as a boundary of the service area.

9. The device of claim 8, wherein the processor is further configured to:
determine whether the following conditions are satisfied for a given anchor of the multiple anchors:
a range of the given anchor from each of the other anchors is less than a first threshold;
a number of non-line-of-sight UWB ranging measurements is less than a second threshold; and
an obstacle proximate to any other anchor of the multiple anchors is greater than a third threshold;
in response to any of the conditions not being satisfied, estimate an adjusted position for the given anchor based on UWB signal coverage and the image data; and
control the device to display the adjusted position on a user interface as a suggested new position for the given anchor.

10. The device of claim 8, wherein the processor is further configured to:
determine local coordinates of the anchors based on additional UWB ranging measurements between pairs of the anchors; and
align the local coordinates of the anchors with a geographic coordinate system based on at least one of: the image data, the IMU data, satellite image data, and GPS data.

11. The device of claim 10, wherein the processor is further configured to:
estimate coordinates of at least one of the device and the robot in at least a local coordinate system via UWB ranging.

12. The device of claim 10, wherein the anchors are logically arranged as a sequence of anchors, and the local coordinates of the anchors are determined based on a coordinate system defined by at least three anchors of the sequence of anchors.

13. The device of claim 8, further comprising a transceiver configured to transmit the boundary of the service area to the robot.

14. The device of claim 8, wherein each image data point and each IMU data point are associated with a respective timestamp and a respective point along the trajectory.

15. A non-transitory computer readable medium comprising program code that, when executed by a processor of a device, causes the device to:
when the device is in motion within a service area to be traversed by a robot:
obtain ultra-wideband (UWB) ranging measurements between the device and multiple anchors located in the service area; and
obtain image data and inertial measurement unit (IMU) data;
determine a trajectory of motion of the device based on the UWB ranging measurements;
adjust the trajectory based on image features obtained from the image data and motion estimates obtained from the IMU data by combining the image data and the motion estimates using weights determined by a set of confidence values; and
identify the adjusted trajectory as a boundary of the service area.

16. The non-transitory computer readable medium of claim 15, wherein the program code, when executed by the processor, further causes the device to:
determine whether the following conditions are satisfied for a given anchor of the multiple anchors:
a range of the given anchor from each of the other anchors is less than a first threshold;
a number of non-line-of-sight UWB ranging measurements is less than a second threshold; and
an obstacle proximate to any other anchor of the multiple anchors is greater than a third threshold;
in response to any of the conditions not being satisfied, estimate an adjusted position for the given anchor based on UWB signal coverage and the image data; and
control the device to display the adjusted position on a user interface as a suggested new position for the given anchor.

17. The non-transitory computer readable medium of claim 15, wherein the program code, when executed by the processor, further causes the device to:
  determine local coordinates of the anchors based on additional UWB ranging measurements between pairs of the anchors; and
  align the local coordinates of the anchors with a geographic coordinate system based on at least one of: the image data, the IMU data, satellite image data, and GPS data.

18. The non-transitory computer readable medium of claim 17, wherein the program code, when executed by the processor, further causes the device to estimate coordinates of at least one of the device and the robot in at least a local coordinate system via UWB ranging.

19. The non-transitory computer readable medium of claim 17, wherein the anchors are logically arranged as a sequence of anchors, and the local coordinates of the anchors are determined based on a coordinate system defined by at least three anchors of the sequence of anchors.

20. The non-transitory computer readable medium of claim 15, wherein the program code, when executed by the processor, further causes the device to transmit the boundary of the service area to the robot.

* * * * *